US007680485B2

(12) United States Patent
Takada

(10) Patent No.: US 7,680,485 B2
(45) Date of Patent: Mar. 16, 2010

(54) RADIO CONTROLLED TIMEPIECE, ELECTRONIC DEVICE AND TIME CORRECTION METHOD

(75) Inventor: Akinari Takada, Mitaka (JP)

(73) Assignee: Citizen Holdings Co., Ltd., Tokyo (JP)

( * ) Notice: Subject to any disclaimer, the term of this patent is extended or adjusted under 35 U.S.C. 154(b) by 501 days.

(21) Appl. No.: 10/584,254

(22) PCT Filed: Dec. 24, 2004

(86) PCT No.: PCT/JP2004/019339

§ 371 (c)(1),
(2), (4) Date: Jun. 23, 2006

(87) PCT Pub. No.: WO2005/062137

PCT Pub. Date: Jul. 7, 2005

(65) Prior Publication Data

US 2007/0152900 A1 Jul. 5, 2007

(30) Foreign Application Priority Data

Dec. 24, 2003 (JP) ............................. 2003-426012

(51) Int. Cl.
*H04M 1/66* (2006.01)
*G04C 11/02* (2006.01)
*G04C 11/00* (2006.01)

(52) U.S. Cl. ............................ 455/411; 368/47; 368/46

(58) Field of Classification Search ................. 455/411, 455/457, 502.47, 419, 425, 347; 368/46, 368/10, 187, 47; 343/788, 718; 375/242; 370/328; 340/7.1

See application file for complete search history.

(56) References Cited

U.S. PATENT DOCUMENTS

| | | | | |
|---|---|---|---|---|
| 6,166,651 | A * | 12/2000 | Kushita | 340/7.1 |
| 6,192,007 | B1 * | 2/2001 | Aoshima | 368/10 |
| 6,288,977 | B1 | 9/2001 | Yoshida et al. | |
| 6,728,533 | B2 * | 4/2004 | Ishii | 455/425 |
| 2003/0117901 | A1 | 6/2003 | Takada et al. | |

FOREIGN PATENT DOCUMENTS

| | | | |
|---|---|---|---|
| JP | 5-142363 | A | 6/1993 |
| JP | 11-211857 | A | 8/1999 |
| JP | 2002-296374 | A | 10/2002 |
| JP | 2003-270370 | A | 9/2003 |
| JP | 2003-279676 | A | 10/2003 |
| JP | 2004-325278 | A | 11/2004 |

* cited by examiner

*Primary Examiner*—Charles N Appiah
*Assistant Examiner*—Kiet Doan
(74) *Attorney, Agent, or Firm*—Foley & Lardner LLP

(57) ABSTRACT

A clocking unit (27) that clocks a time; a display unit (3) that displays a time based on clock information from the clocking unit (27); a receiving unit (20) that receives standard radio waves from transmitting stations in at least two countries or regions; a second-synchronization detecting unit (23) that detects second-synchronization information (P3) from a demodulated signal (P2) obtained by the receiving unit (20); a transmitting station determining unit (25) that analyzes the demodulated signal (P2) based on the second-synchronization information (P3) to determine a transmitting station in a country or a region; and a decoding unit (26) decodes information included in the standard radio wave from the transmitting station determined by the transmitting station determining unit (25) to obtain time information are included, and the clock information of the clocking unit (27) is corrected based on the time information obtained by the decoding unit (26).

11 Claims, 14 Drawing Sheets

RADIO CONTROLLED TIMEPIECE, ELECTRONIC DEVICE AND TIME CORRECTION METHOD

TECHNICAL FIELD

The present invention relates to a radio controlled timepiece that receives standard radio waves including time information and that automatically corrects the time based on the received time information, an electronic device, and a time correction method, and more particularly, to improvement of a radio controlled timepiece capable of receiving the standard radio waves from transmitting stations in plural countries or regions, an electronic device, and a time correction method.

BACKGROUND ART

Radio controlled timepieces receiving standard radio waves including time information with small antennas to automatically correct the time are actively commercialized as technologies are developed for smaller high-performance antennas, receiving apparatuses with low power consumption, cost reduction, etc. Transmitting stations transmitting standard radio waves are constructed not only in Japan but also other countries and regions such as America, Europe, and Asia, and spreading across the world. Therefore, it has become possible to receive standard radio waves from a plurality of transmitting stations in more and more countries and regions, and as internationalization has advanced, such a chance has been increasing that users of radio controlled timepieces travel all over the world and receive standard radio waves of each country or region.

However, the standard radio waves have a different time information format for each country, and transmission frequencies may be different in countries or regions. Therefore, to receive the standard radio waves of each country and region to obtain the time information, a radio controlled timepiece needs unit for switching decoding algorithms that decode the time information formats correspondingly to the standard radio waves of each transmitting station and unit for switching reception frequencies if transmission frequencies are different. A manual reception switching mode and an automatic reception switching mode are proposed for the switching unit for receiving the standard radio waves from a plurality of transmitting stations.

In the manual reception switching mode, a user of the radio controlled timepiece recognizes a transmitting station available in the country or the region where the user is positioned, and switches a transmitting station for reception with a reception changeover switch, etc. to receive the standard radio waves. In this case, it is inconvenient since the user must recognize the transmitting station that transmits the standard radio waves in each country and region and operate the reception changeover switch, etc. for switching the reception. Furthermore, it is very problematic that an accurate time cannot always be displayed since a transmitting station suitable for reception of the standard radio wave may not be selected.

To solve such problems, for one of the automatic reception switching modes, a time data reception apparatus is proposed that switches a reception frequency of standard radio waves in accordance with frequencies stored in a storing unit that which determines whether the reception of the standard radio wave succeeds or fails and that selects the standard radio wave suitable for reception among standard radio waves with different frequencies (for example, see patent document 1).

According to this proposed technique, the time data reception apparatus includes a receiving unit that receives a plurality of standard radio waves with different frequencies, a reception frequency switching unit that switches a frequency of the received standard radio wave, a controlling unit that controls the reception frequency switching unit, and a current time correcting unit that corrects current time data based on received time data. The time data reception apparatus further includes a success/failure determining unit that determines whether the receiving unit has succeeded or failed in reception of the standard radio wave, and a storing unit that stores reception frequencies. The controlling unit controls the reception frequency switching unit such that a frequency of the standard radio wave received by the receiving unit is switched to the frequency stored in the storing unit. If the success/failure determining unit determines that the reception has been failed, the reception frequency switching unit is controlled to switch a frequency, and if the success/failure determining unit determines that the reception has been succeeded, the frequency of the standard radio wave received by the receiving unit can be stored in the storing unit. As a result, a successfully received standard radio wave can be quickly selected from a plurality of standard waves with different frequencies and time information can be obtained from the selected standard radio wave to correct the time automatically.

In another automatic reception switching mode, the standard radio waves with different frequencies are sequentially received by a receiving unit that receives the standard radio waves, and a reception state is detected for each standard radio wave by a reception state detecting unit. The standard radio wave for obtaining time information is designated based on the difference of the reception states (for example, patent document 2).

This proposed technique includes a receiving unit that sequentially receives the standard radio waves with different frequencies, a reception status detecting unit that detects the reception states of the standard radio waves received by the receiving unit, a received signal designating unit that designates one standard radio wave for obtaining time information from among the standard radio waves based on each reception state detected by the reception status detecting unit, and a time information obtaining unit that obtains time information from the standard radio wave designated by the received signal designating unit. The automatic time correction can be performed with the obtained time information. As a result, since each of the standard radio waves with different frequencies is received to be detected the reception state thereof, the time information can be obtained by designating the standard radio wave suitable for reception, and a reliable radio controlled timepiece can be realized.

Patent Document 1: Japanese Patent Application Laid-Open Publication No. 2003-270370 (claims, FIG. 1)

Patent Document 2: Japanese Patent Application Laid-Open Publication No. 2002-296374 (claims, FIG. 1)

DISCLOSURE OF INVENTION

Problem to be Solved by the Invention

However, in the above two proposed techniques, even though it is possible to select a standard radio wave suitable for reception from among standard radio waves having different frequencies to obtain time information, a standard radio wave in a different time information format cannot be received. For example, in Japan, two transmitting stations exist, which are the Fukushima station using a frequency of 40 KHz and the Kyushu station using a frequency of 60 KHz, and the two transmitting stations transmit standard radio waves having different frequencies and the same time information format, which can be received by the automatic reception switching modes of the above proposed techniques without problems. However, since the time information format of the standard radio wave is different in each country, if a user travels around the world, the standard radio wave transmitted by a transmitting station in each country cannot be automatically received to obtain time information in the radio controlled timepiece according to the above techniques. That is, the above techniques are problematic in that the standard radio waves from transmitting stations in two or more countries cannot be received automatically.

It is an object of the present invention to solve the above problems and to provide a global fully automatic radio controlled timepiece, an electronic device, and a time correction method with which correction to a standard time of a country or region can always be performed by selecting a transmitting station from which the standard radio wave can be automatically received and by obtaining time information even if a user of the radio controlled timepiece travels various countries or regions.

Means for Solving Problem

To solve the above problems, a radio controlled timepiece, an electronic device, and a time correction method of the present invention employ the following configuration and method.

A radio controlled timepiece according to the present invention includes a clocking unit configured to clock a time; a display unit configured to display a time based on clock information from the clocking unit; a receiving unit configured to receive standard radio waves from transmitting stations in at least two countries or regions; a second-synchronization detecting unit configured to detect second-synchronization information from a demodulated signal obtained by the receiving unit; a transmitting station determining unit configured to analyze the demodulated signal based on the second-synchronization information to determine a transmitting station in a country or a region; and a decoding unit configured to decode information included in the standard radio wave from the transmitting station determined by the transmitting station determining unit to obtain time information. The clock information of the clocking unit is corrected based on the time information obtained by the decoding unit.

Since the radio controlled timepiece of the present invention can receive the standard radio waves from the transmitting stations in two or more countries or regions to obtain the time information, even if a user of the radio controlled timepiece travels around countries or regions, the standard radio wave can always be received automatically from the transmitting station in each country or region to perform the time correction.

Moreover, the receiving unit includes a reception switching unit and configured to receive a standard radio wave from another transmitting station with the reception switching unit if the second-synchronization information cannot be detected by the second-synchronization detecting unit, if the transmitting station cannot be determined by the transmitting station determining unit, or if the time information cannot be decoded by the decoding unit.

In this way, even if the time information cannot be obtained from the received standard radio wave, since the standard radio wave from another transmitting station can be received with the reception switching unit, the transmitting station optimum for reception can be selected and the radio controlled timepiece with excellent reception performance can be provided.

Furthermore, the radio controlled timepiece according to the present invention includes a clocking unit configured to clock a time; a display unit configured to display a time based on clock information from the clocking unit; a receiving unit configured to receive standard radio waves having an identical frequency from transmitting stations in at least two countries or regions; a second-synchronization detecting unit configured to detect second-synchronization information from a demodulated signal obtained by the receiving unit; a transmitting station determining unit configured to analyze the demodulated signal based on the second-synchronization information to determine a transmitting station in a country or a region; and a decoding unit configured to decode information included in the standard radio wave from the transmitting station determined by the transmitting station determining unit to obtain time information. The clock information of the clocking unit is corrected based on the time information obtained by the decoding unit.

Moreover, in the radio controlled timepiece according to the present invention, the second-synchronization detecting unit includes an edge detecting unit configured to sequentially detect rising edges and falling edges of the demodulated signal; and a synchronization determining unit configured to obtain the second-synchronization information of the demodulated signal based on the detected rising edges or the detected falling edges.

Furthermore, in the radio controlled timepiece according to the present invention, the second-synchronization detecting unit includes an edge detecting unit configured to synchronously detect rising edges and falling edges of the demodulated signal; and a synchronization determining unit configured to obtain the second-synchronization information of the demodulated signal based on the detected rising edges or the detected falling edges.

Moreover, in the radio controlled timepiece according to the present invention, the second-synchronization detecting unit includes a sampling unit configured to detect rising edges and falling edges of the demodulated signal at regular intervals; an adding unit configured to add up number of times of detection of the rising edges and the falling edges detected by the sampling unit for each sampling position; a storing unit configured to store the number of times of the detection of the rising edges and the falling edges added up for each sampling position by the adding unit; and a waveform determining unit configured to obtain the second-synchronization information of the demodulated signal based on the number of times of the detection of the rising edges and the falling edges for each sampling position stored in the storing unit.

Furthermore, in the radio controlled timepiece according to the present invention, the second-synchronization detecting unit includes a sampling unit configured to detect logic "1" or logic "0" of the demodulated signal at regular intervals; and an adding unit configured to add up number of times of detection of any one of the logic "1" and the logic "0" detected by the sampling unit. The transmitting station determining unit is configured to determine the transmitting station in the country or region based on a result of addition by the adding unit in the second-synchronization detecting unit.

Moreover, in the radio controlled timepiece according to the present invention, the transmitting station determining unit is configured to analyze the demodulated signal based on the second-synchronization information to determine the transmitting station in the country or region from a waveform of a position marker (P-code, M-code, or minute marker) appearing in a constant cycle.

Furthermore, in the radio controlled timepiece according to the present invention, the transmitting station determining unit is configured to analyze the demodulated signal based on the second-synchronization information to determine the transmitting station in the country or region based on a particular waveform of the demodulated signal.

Moreover, in the radio controlled timepiece according to the present invention, the second-synchronization detecting unit is configured to prioritize an order in determination of the transmitting station by the transmitting station determining unit based on the detected second-synchronization information.

Furthermore, the radio controlled timepiece according to the present invention includes a clocking unit configured to clock a time; a display unit configured to display a time based on clock information from the clocking unit; a receiving unit configured to receive standard radio waves from transmitting stations in at least two countries or regions; a transmitting station determining unit configured to analyze a demodulated signal obtained by the receiving unit to determine a transmitting station in a country or a region based on a particular waveform of the demodulated signal; a decoding unit configured to decode information included in the standard radio wave from the transmitting station determined by the transmitting station determining unit to obtain time information. The clock information of the clocking unit is corrected based on the time information obtained by the decoding unit.

Moreover, in the radio controlled timepiece according to the present invention, the receiving unit is configured to receive a standard radio wave of a transmitting station from which a standard radio wave is successfully received in last reception, first.

Furthermore, the radio controlled timepiece according to the present invention includes a storing unit configured to store information on a transmitting station for which reception has succeeded before, and the receiving unit is configured to determine an order of switching based on the information on the transmitting station stored in the storing unit.

Moreover, an electronic device according to the present invention includes the above radio controlled timepiece.

Furthermore, a time correction method according to the present invention includes a clocking step of clocking a time; a display step of displaying a time based on clock information obtained at the clocking step; a receiving step of receiving standard radio waves from transmitting stations in at least two countries or regions; a second-synchronization detecting step of detecting second-synchronization information from a demodulated signal obtained at the receiving step; a transmitting station determining step of analyzing the demodulated signal based on the second-synchronization information to determine a transmitting station in a country or a region; and a decoding step of decoding information included in the standard radio wave from the transmitting station determined at the transmitting station determining step to obtain time information. The clock information obtained at the clocking step is corrected based on the time information obtained at the decoding step.

Effect of the Invention

According to the present invention, since standard radio waves are received from transmitting stations in at least two countries or regions and second-synchronization information is detected from a demodulated signal obtained by the reception to determine the transmitting station of the standard radio wave based on the second-synchronization information, a radio controlled timepiece can be provided that can automatically select a receivable transmitting station to always perform automatic correction to the standard time in each country and region even if a user of the radio controlled timepiece travels around the countries and the regions.

BRIEF DESCRIPTION OF DRAWINGS

FIG. 1-2 is an explanatory diagram of transmitting stations that transmit standard radio waves.

FIG. 2 is an explanatory diagram of a waveform pattern of a demodulated signal obtained by demodulating a standard radio wave of each country.

FIG. 11-1 is an explanatory diagram of the demodulated signal and sampling relationship in the standard radio wave of Japan in relation to an operation of a waveform determination circuit of a second-synchronization detecting unit according to the third embodiment of the present invention.

FIG. 11-2 is an explanatory diagram in which the number of times of detection of rising edges is expressed in a graph in relation to the operation of the waveform determination circuit of the second-synchronization detecting unit in the third embodiment of the present invention.

FIG. 11-3 is an explanatory diagram in which the number of times of detection of falling edges is expressed in a graph in relation to the operation of the waveform determination circuit of the second-synchronization detecting unit in the third embodiment of the present invention.

FIG. 12-1 is an explanatory diagram in which the number of times of detection of rising edges in the standard radio wave of an America station is expressed in a graph.

FIG. 12-2 is an explanatory diagram in which the number of times of detection of falling edges in the standard radio wave of the America station is expressed in a graph.

FIG. 13-1 is an explanatory diagram in which the number of times of detection of rising edges in the standard radio wave of a Britain station is expressed in a graph.

FIG. 13-2 is an explanatory diagram in which the number of times of detection of falling edges in the standard radio wave of the Britain station is expressed.

EXPLANATIONS OF LETTERS OR NUMERALS

Figure 1:
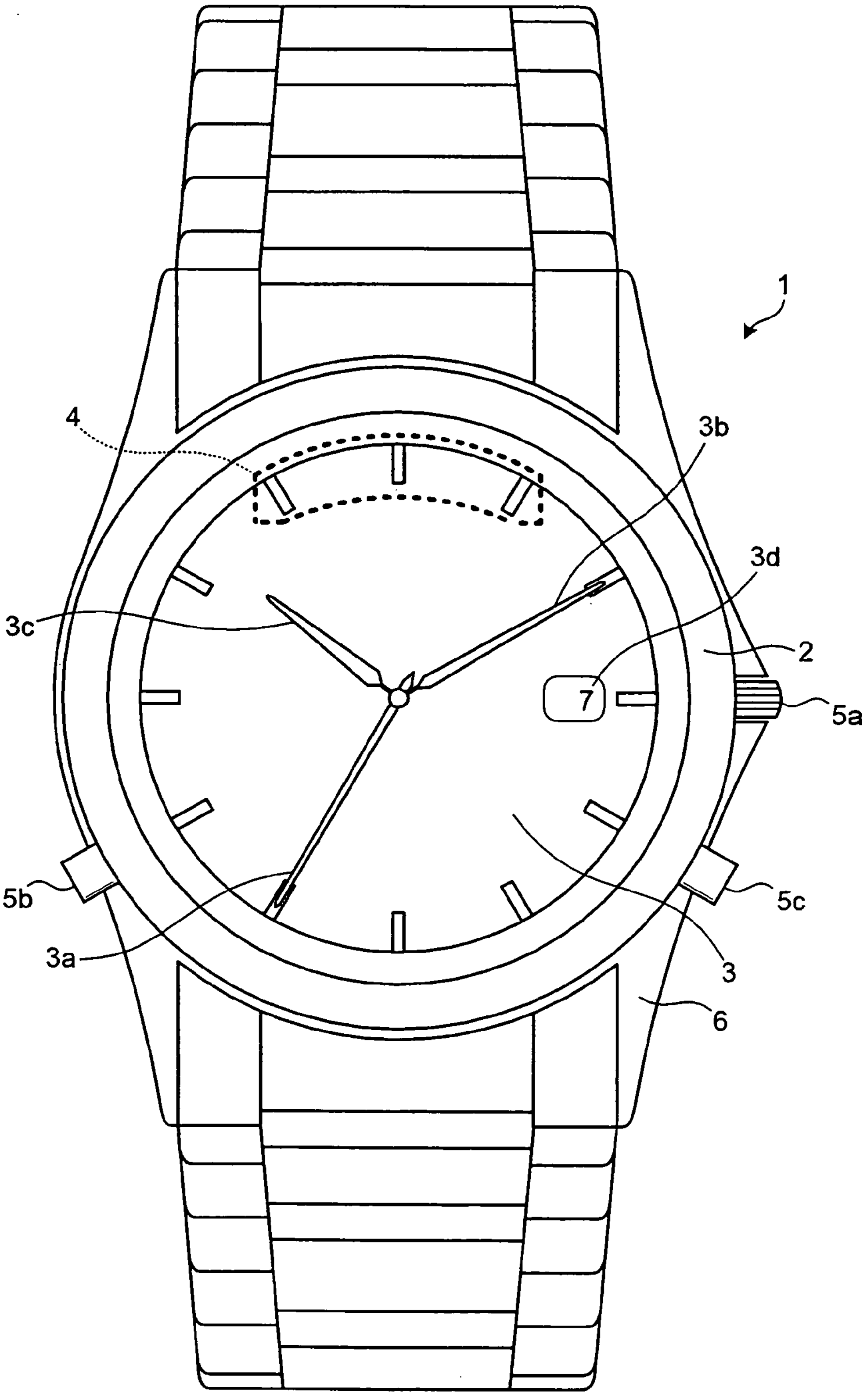
FIG. 1-1 is an explanatory diagram of an example of a radio controlled timepiece according to the present invention.

1 Radio controlled timepiece
3 Display unit

4 Reception antenna
5 (5*a* to 5*c*) Input unit
10 to 15 Transmitting station
10*a* to 15*a* Standard radio wave
20 Receiving unit
20*a* Tuning unit
21 Reception IC
22 Controlling unit
23, 32 Second-synchronization detecting unit
23*a* Edge detection circuit
23*b* Counter
23*c* Synchronization determination circuit
24, 32*c* RAM
25 Transmitting station determining unit
26 Decoding unit
27 Clocking unit
28 Display driving unit
29 ROM
30 Reference signal source
31 Power source unit
32*a* Sampling detection circuit
32*b* Adding circuit
32*d* Waveform determination circuit
P1 Tuning signal
P2 Demodulated signal
P3 Second-synchronization information
P4 Transmitting station information
P5 Time information
P6 Clocking information
P7 Driving signal
P8 Input signal
P9 Reference signal
P10 Reception control signal
P11 Count data

BEST MODE(S) FOR CARRYING OUT THE INVENTION

Embodiments of a radio controlled timepiece, an electronic device, and a time correction method according to the invention will be explained in detail below with reference to the drawings. The present invention is not limited to the embodiments.

Figures 1, 2:
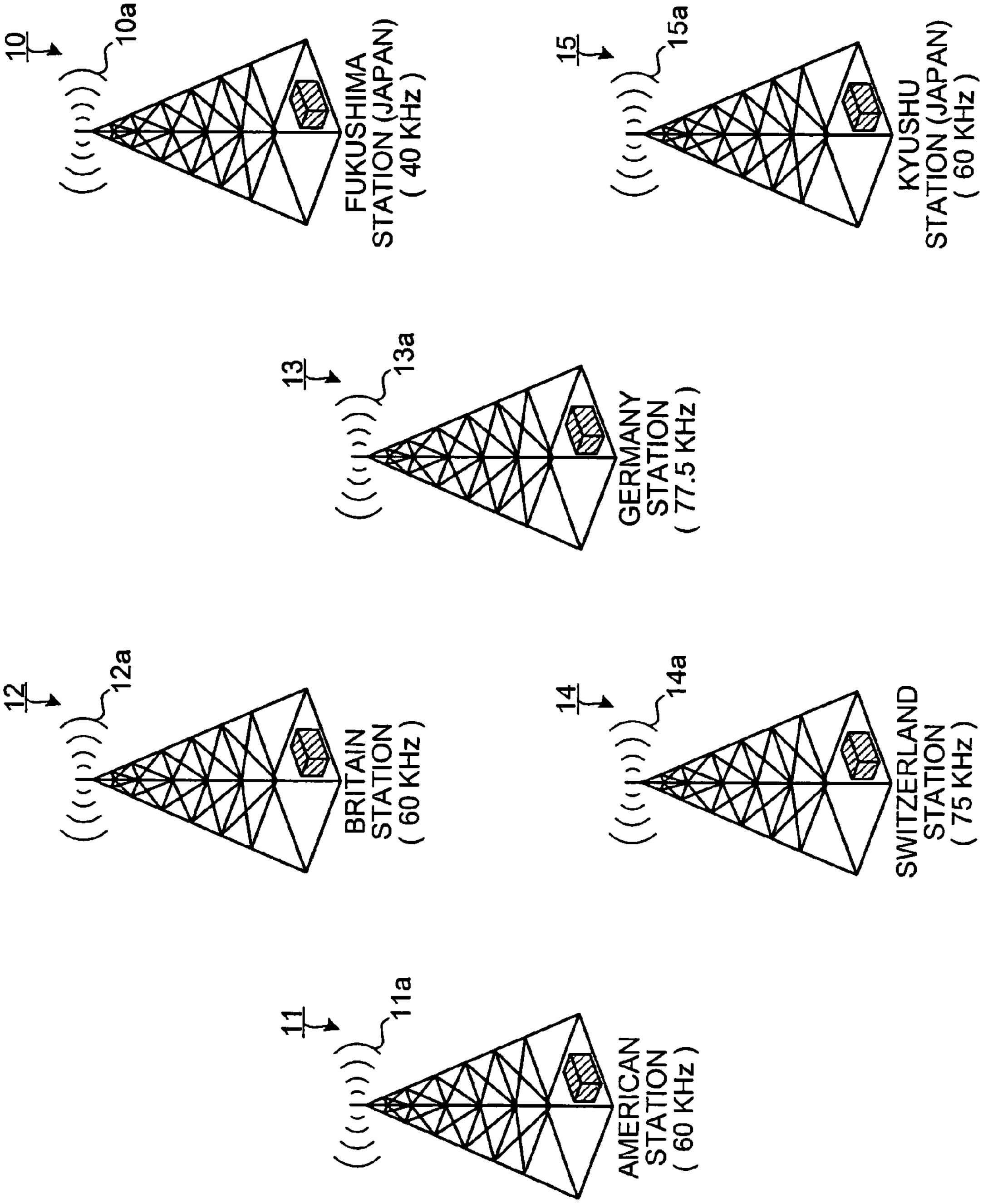
Figure 2:
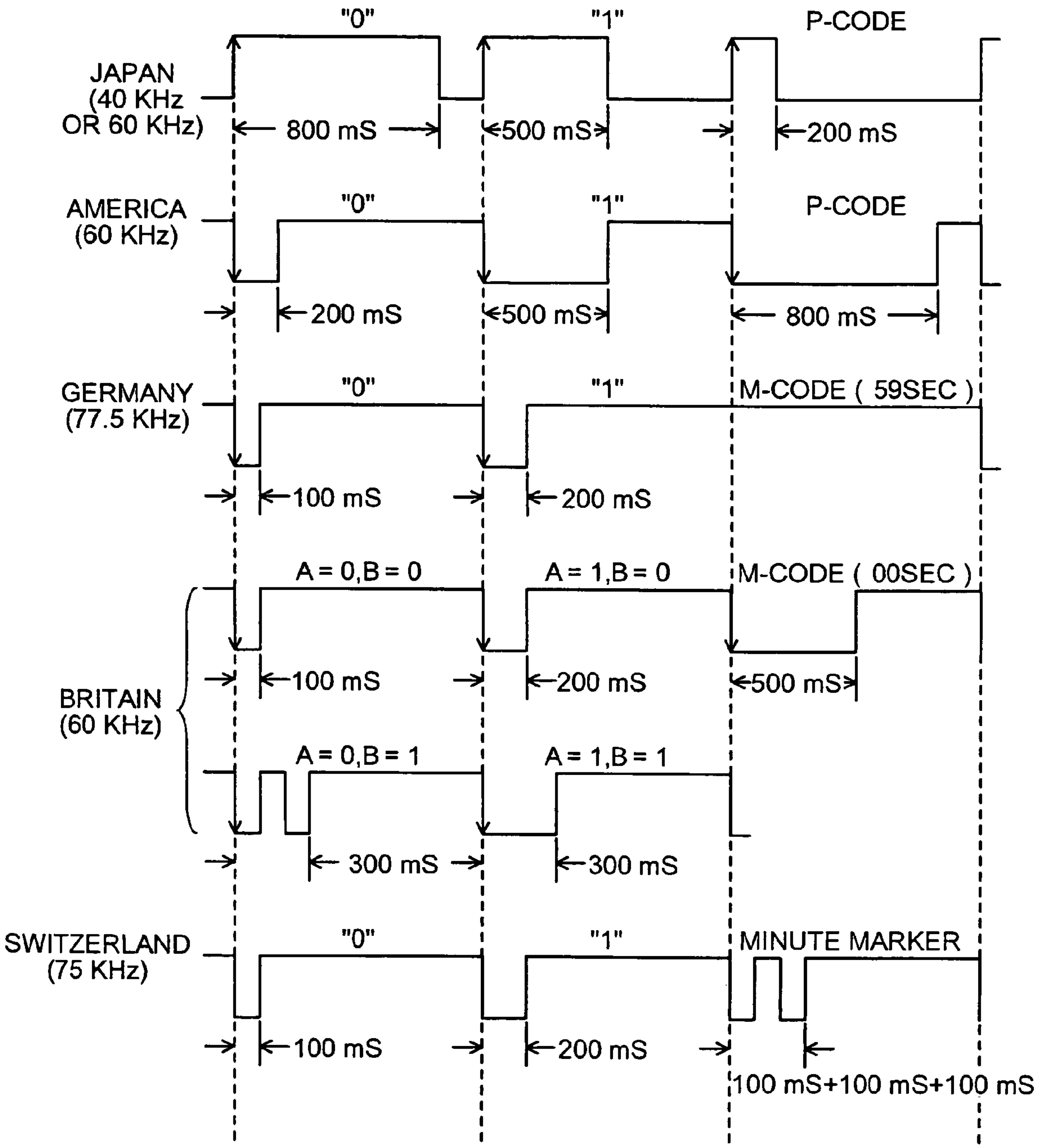

FIG. 1-1 is an explanatory diagram of an example of a radio controlled timepiece of the present invention and FIG. 1-2 is an explanatory diagram of transmitting stations transmitting standard radio waves. With reference to FIG. 1-1 and FIG. 1-2, description will be made of an outline of the radio controlled timepiece of the present invention and the transmitting station that transmits the standard radio wave. In FIG. 1-1, a numeral 1 represents an analog display radio controlled timepiece of the present invention. A numeral 2 represents an exterior portion made from metal, etc. and a numeral 3 represents a display unit, for example, display unit composed of a second hand 3*a*, a minute hand 3*b*, an hour hand 3*c*, and a date display unit 3*d* that displays a date. A numeral 4 represents an ultra-compact reception antenna that is positioned in the direction of 12 o'clock inside the exterior portion. However, a position of the antenna is not limited to this position, and the antenna may be positioned in, for example, the direction of 9 o'clock. A numeral 5*a* represents a winder for correcting a time and date, corresponding to a portion of an input unit, and is linked to a plurality of electric switches (not shown). Numerals 5*b* and 5*c* represent operation buttons corresponding to a portion of the input unit and are linked to a plurality of electric switches (not shown). A numeral 6 represents a band for putting on an arm of a user (not shown).

Numerals 10 to 15 represent transmitting stations constructed in each country for transmitting standard radio waves 10*a* to 15*a* including time information, and as an example, a transmitting station 10 represents the Fukushima station in Japan using a frequency of 40 KHz; a numeral 11 represents an America station using a frequency of 60 KHz; a numeral 12 represents a Britain station using a frequency of 60 KHz; a numeral 13 represents a Germany station using a frequency of 77.5 KHz; a numeral 14 represents a Switzerland station using a frequency of 75 KHz; and a numeral 15 represents a Kyushu station using a frequency of 60 KHz. The standard radio waves 10*a* to 15*a* transmitted from these transmitting stations 10 to 15 can be received within about 1000 Km in radius and time information formats of these standard radio waves 10*a* to 15*a* are set individually in each country.

To receive any one of the standard radio waves 10*a* to 15*a*, preferably, a portion at which the reception antenna 4 is positioned in the radio controlled timepiece 1 is faced toward the direction of one of the transmitting stations 10 to 15, and a reception start button (for example, the operation button 5*c*) is pressed. In this way, the radio controlled timepiece 1 starts the reception operation to receive one of the incoming standard radio waves 10*a* to 15*a*. The radio controlled timepiece 1 converts the received standard radio wave to a demodulated signal, determines from which one of the transmitting stations the standard radio wave is the received, uses a decoding algorithm corresponding to a time information format of the received standard radio wave for decoding, obtains the time information such as second, minute, hour, data, etc. and data indicating whether it is a leap year or daylight saving time is on, clocks the obtained time information, and displays the time information and date on the display unit 3.

FIG. 2 is an explanatory diagram of a waveform pattern of the demodulated signal obtained by demodulating the standard radio wave of each country. With reference to FIG. 2, description will be made of patterns of the standard radio waves of representative countries shown by way of example in FIG. 1-2. These demodulated signals are synchronized signals that are accurately synchronized to one second. For example, a demodulated signal of Japan is synchronized at rising edges to one second, and demodulated signals of America, Germany, and Britain are synchronized at falling edges to one second. Based on the positions synchronized to one second (for example, second-synchronization position), one-bit information is represented in every second in Japan, America, and Germany, and two-bit information is represented in every second in Britain.

For example, in Japan, if an 800-mS H-level pulse is continued from the second-synchronization position (for example, rising edge), logic "0" is represented and if a 500-mS H-level pulse is continued, logic "1" is represented. A data delimiter marker called a position marker (P-code) is represented by 20-mS H-level pulse. In America, if a 200-mS L-level pulse is continued from the second-synchronization position (for example, falling edge), logic "0" is represented and if a 500-mS L-level pulse is continued, logic "1" is represented. The P-code is represented by 800-mS L-level pulse.

In Germany, if a 100-mS L-level pulse is continued from the second-synchronization position (for example, falling edge), logic "0" is represented and if a 200-mS L-level pulse is continued, logic "1" is represented. A marker generated every minute to indicate 59-second is called an M-code and represented by maintaining an H-level. In Britain, as described above, two-bit information is represented in one second and when the two bit information is assumed to be A and B: A=0 and B=0 are represented by a 100-mS L-level pulse from the second-synchronization position; A=1 and B=0 are represented by a 200-mS L-level pulse; A=0 and B=1 are represented by two 100-mS L-level pulse; and A=1 and B=1 are represented by a 300-mS L-level pulse. An M-code generated every minute to indicate 00-second is represented by a 500-mS L-level pulse.

In Switzerland, if a 100-mS L-level pulse is continued from the second-synchronization position (for example, falling edge), logic “0” is represented and if a 200-mS L-level pulse is continued, logic “1” is represented. A minute marker is represented by two 100-mS L-level pulse.

As described above, the standard radio wave represents logic with a signal synchronized with one second and the time information such as hour, minute, date, etc. is represented in cycles of one minute. Although details of the time information format of each country will not be described here since these are not directly relevant to the present invention, to identify a transmitting station (for example, country) of the standard radio wave from the standard radio wave received by the radio controlled timepiece, a second-synchronization position of the received standard radio wave is detected; it is determined whether the second-synchronization position conforms to the rising edge or falling edge of the demodulated signal; and a pulse width, etc. are analyzed based on the detected second-synchronization position to determine the transmitting station of the received standard radio wave.

Since the time information format of the standard radio wave of each country is disclosed, the time information can be obtained from a standard radio wave of any country by identifying the transmitting station of the received standard radio wave and decoding the time information in accordance with the format. Based on the above idea, the present invention provides the radio controlled timepiece that can automatically obtain the time information from the standard radio wave of each country. Description will hereinafter be made based on embodiments.

First Embodiment

Figure 3:
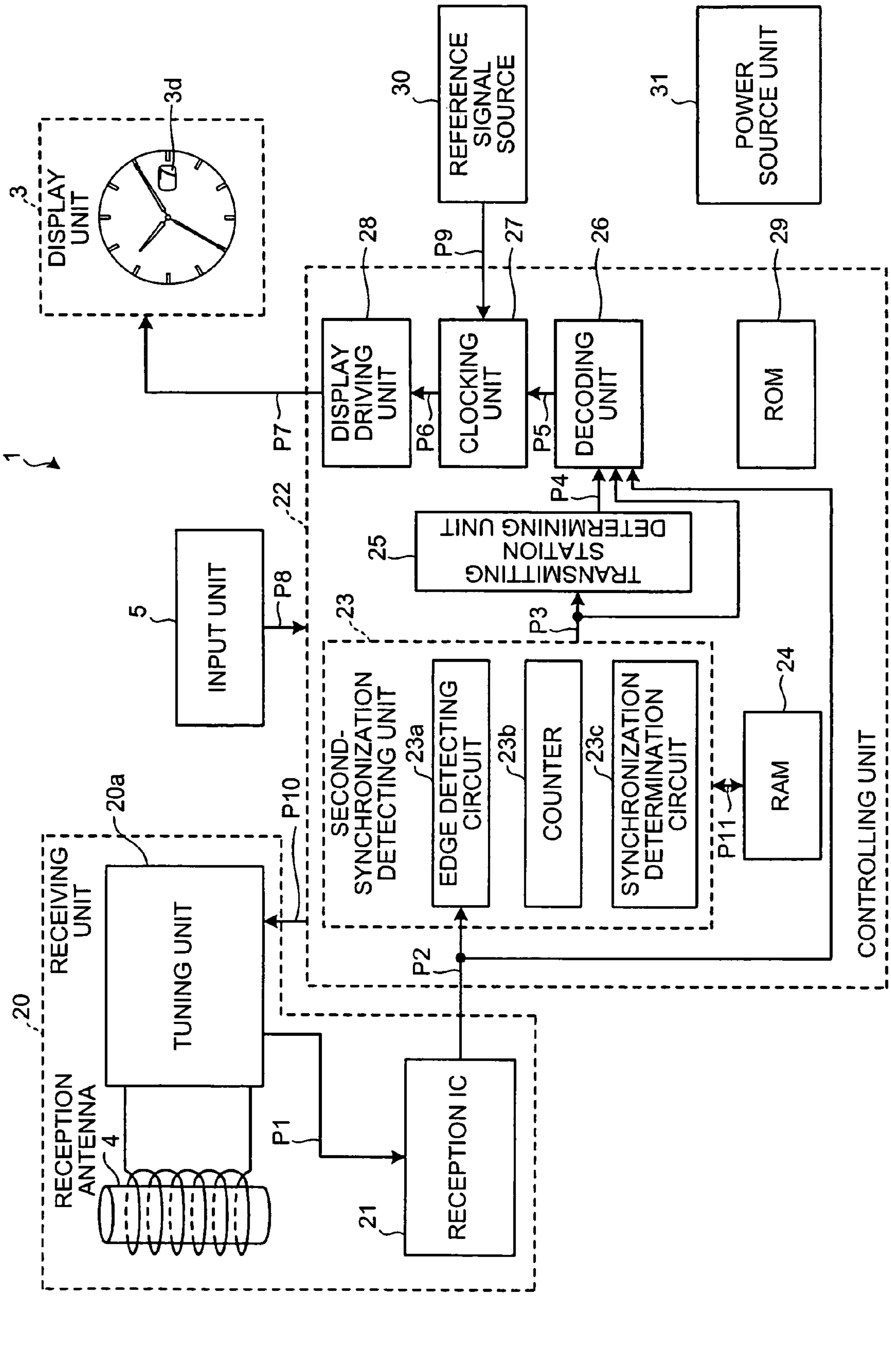
FIG. 3 is a circuit block diagram of a radio controlled timepiece according to a first embodiment and a second embodiment of the present invention.

FIG. 3 is a circuit block diagram of the radio controlled timepiece of a first embodiment and a second embodiment of the present invention. With reference to FIG. 3, description will be made of an outline of a circuit configuration of the radio controlled timepiece 1 of the first embodiment of the present invention. In FIG. 3, a numeral 20 represents a receiving unit that selectively receives the standard radio wave of the transmitting station in each country. The receiving unit 20 is constituted by a reception antenna 4 that receives the standard radio waves, a tuning unit 20*a*, as a reception switching unit, that forms a tuning circuit together with the reception antenna 4, and a reception IC 21. The tuning unit 20*a* has a plurality of tuning condensers not shown therein, switches the plurality of the tuning condensers for the reception antenna 4 to change a tuning frequency of the tuning circuit to switch the reception frequency of the standard radio wave, and outputs a tuning signal P1.

The reception IC 21 has an amplifier circuit, a filter circuit, a decode circuit, etc. not shown therein and inputs the tuning signal P1 to output a demodulated signal P2 that is a converted digital signal. A numeral 22 is controlling unit that controls the radio controlled timepiece 1 as a whole and the controlling unit is constituted by a second-synchronization detecting unit 23 that inputs the demodulated signal P2 to output second-synchronization information P3; a RAM 24 that stores various data temporarily; a transmitting station determining unit 25 that inputs the second-synchronization information P3 to determine the transmitting station; a decoding unit 26 that inputs the transmitting station information P4, the demodulated signal P2, and the second-synchronization information P3 from the transmitting station determining unit 25 to decode the time information format of the demodulated signal P2; a clocking unit 27 that corrects and output clocking information P6 using the time information P5 obtained by the decoding unit; a display driving unit 28 that inputs the clocking information P6 to output a driving signal P7 for driving the display unit 3; a ROM 29 that stores firmware for controlling each operation flow, etc.

The controlling unit 22 outputs a reception control signal to the receiving unit 20 and controls the tuning unit 20*a* to switch the reception frequency of the received standard radio wave and to control the start of the operation of the reception IC 21. The second-synchronization detecting unit 23 is constituted by an edge detection circuit 23*a*, as an edge detecting unit, that detects a rising edge and a falling edge of the demodulated signal P2, a counter 23*b* that measures edge intervals, a synchronization determination circuit 23*c*, as a synchronization determining unit, that obtains the second-synchronization information P3, etc. The controlling unit 22 is preferably a microcomputer operated by the firmware stored in the ROM 29 because flexibility is achieved in the system. However, it is not thus limited, and the controlling unit 22 may be a custom IC that constitutes each function with hardware. The circuit configuration shown in FIG. 3 is not thus limited and may be arbitrarily modified within a range not departing from the gist of the present invention.

The input unit 5 is composed of a winder 5*a* and operation buttons 5*b*, 5*c*, and an input signal P8 is input to the controlling unit 22 to execute a manual time correction, a reception start operation, etc. The display unit 3 inputs the driving signal P7 from the display driving unit 28 to display a time, data, etc. A numeral 30 is a reference signal source housing a crystal oscillator (not shown) that outputs a reference signal P9 to the controlling unit 22, and the reference signal P9 acts as a reference clock that clocks the clocking information P6 stored in the clocking unit 27. A numeral 31 is a power source unit composed of a primary buttery or a secondary battery and supplies power to each circuit block through power lines not shown.

Description will be made of a general operation of the radio controlled timepiece 1 with reference to FIG. 3. When the power source unit 31 supplies power to each circuit block, the controlling unit 22 performs an initialization process to initialize each circuit block. Consequently, the clocking information P6 in the clocking unit 27 of the controlling unit 22 is initialized to 00:00:00 AM; the driving signal P7 is output from the display driving unit 28 based on the initialized clocking information P6 to move the second hand 3*a*, the minute hand 3*b*, and the hour hand 3*c* of the display unit 3 to a reference position 00:00:00 AM; and the date display unit 3*d* is also moved to the reference position 00:00:00 AM. The automatic movement of the display unit 3 to the reference position can be performed when a position detection mechanism is included in a gear train mechanism (not shown) driving the display unit 3 within the radio controlled timepiece 1, and if the position detection mechanism is not included, a user may manipulate the winder 5*a*, etc. for the manual movement to the reference position.

The clocking unit 27 inputs the reference signal P9 from the reference signal source 30 to start clocking the clocking information P6 and the display driving unit 28 output the driving signal P7 based on the clocking information P6 sequentially clocked to drive the display unit 3 continuously. The controlling unit 22 is shifted to a time correction mode by the user manipulating the input unit 5 or by a timer, etc. at regular time intervals. The controlling unit 22 receives the standard radio wave to perform the automatic correction of the display time.

Figure 4:
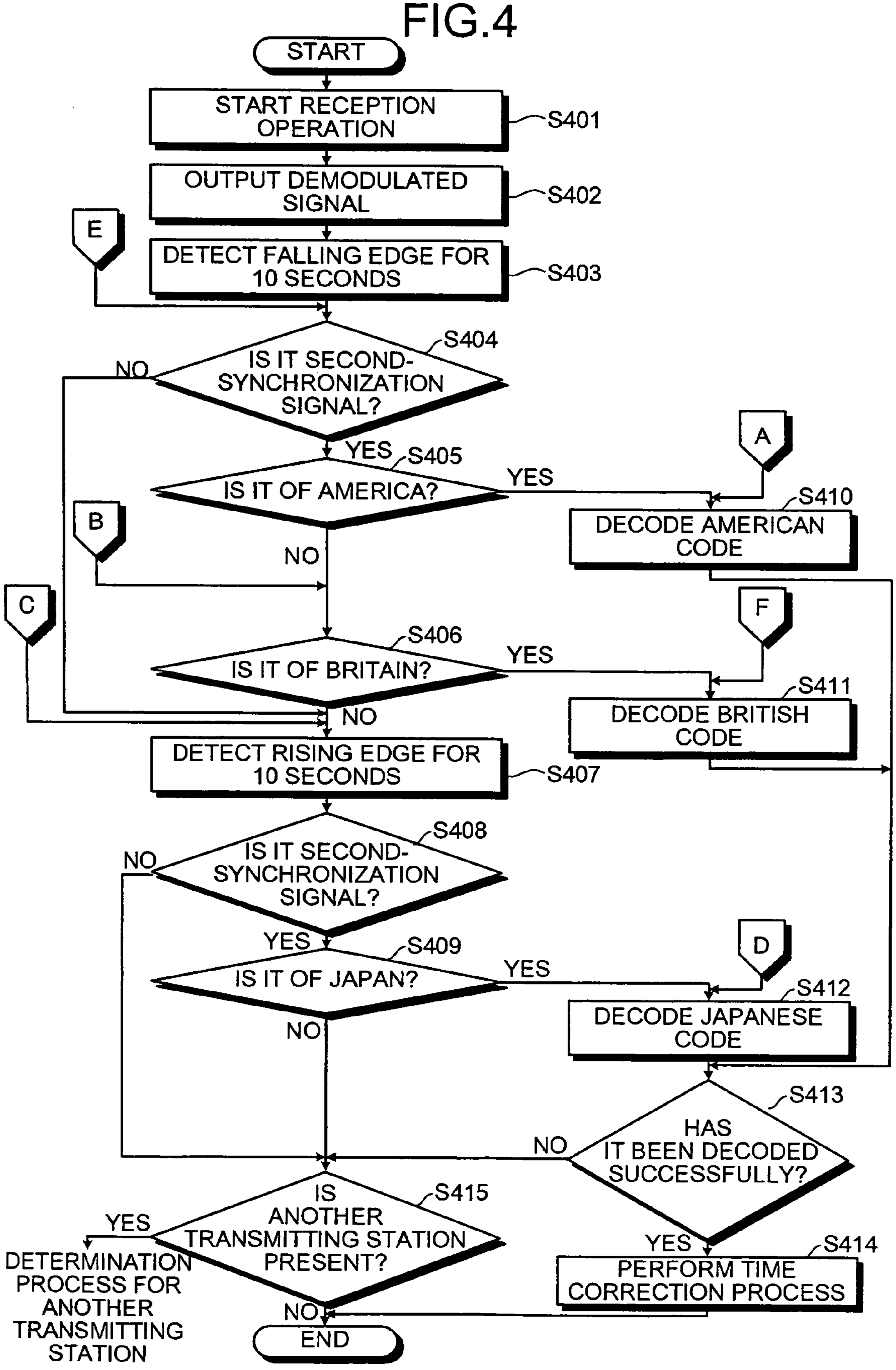
FIG. 4 is a flowchart (part 1) for describing an operation in the first embodiment of the present invention.

FIGS. 4 to 7 are flowcharts for describing the operation of the first embodiment of the present invention. Description will be made of the operation of the time correction mode with reference to the flowcharts of FIGS. 4 to 7. In the flowchart of FIG. 4, when the radio controlled timepiece 1 is shifted to the time correction mode by the manipulation of the user or by the timer, etc., the controlling unit 22 outputs the reception control signal P10 to the receiving unit 20; the tuning unit 20*a* switches the reception frequency to the frequency specified by the reception control signal P10; and the reception IC 21 starts the reception operation for the standard radio wave (step S401).

When the standard radio wave is received by the reception antenna 4, the tuning unit 20*a* outputs the tuning signal P1 and the reception IC 21 inputs and amplifies the tuning signal P1, which is a weak signal, removes noise components, etc. with the filter circuit (not shown), and converts the tuning signal P1 to a digital signal with the decode circuit (not shown) to output the demodulated signal P2 (step S402).

The edge detection circuit 23*a* of the second-synchronization detecting unit 23 inputs the demodulated signal P2 and detects falling edges for a certain period (for example, ten seconds) (step S403). In the case of Japan and America, since a code of a position marker is inserted every ten seconds, the code of the position marker is certainly included by detecting for ten seconds. By including the position marker, the standard radio wave can be identified. That is, in a certain period that does not include the position marker (for example, only “0” and “1” are included), if the Japanese station and the American station is compared, the rising edges and the falling edges cannot be differentiated. Therefore, it is preferable to detect at least for ten seconds.

When the edge detection circuit 23*a* detects a first falling edge, the counter 23*b* is reset and the count operation is continued with a clock signal (not shown) until the next falling edge is detected. When the edge detection circuit 23*a* detects the next falling edge, the count operation of the counter 23*b* is stopped; count data P11 is written into the RAM 24; the counter 23*b* is then reset again; the count operation is continued again until the next falling edge is detected; and this operation is repeated for ten seconds. Consequently, the RAM 24 stores time interval data of the falling edges detected in ten seconds.

The synchronization determination circuit 23*c* of the second-synchronization detecting unit 23 reads the count data P11 stored in the RAM 24, checks how much each of the count data P11 is out of synchronization to one second, and determines whether the falling edges arriving in ten seconds are a second-synchronization signal that is synchronized with one second (step S404). That is, if the number of detection of the falling edges arriving in ten seconds is ten and if the time interval of each falling edge (for example, the count data P11) is equal to or approximately one second, it is determined that the detected falling edges are the second-synchronization signal and that the positions of the falling edges are the second-synchronization positions. However, if the time interval of each falling edge has considerable variation relative to one second, it is determined that the falling edges are not the second-synchronization signal. If it is determined that the falling edges are the second-synchronization signal (step S404, Yes), the operation goes to step S405, and if it is determined that the falling edges are not the second-synchronization signal (step S404, No), the operation goes to step S407. Ten seconds of the detection time may be changed arbitrarily.

If it is determined that the falling edges are the second-synchronization signal at step S404 (step S404, Yes), the second-synchronization detecting unit 23 output the second-synchronization information P3 to the transmitting station determining unit 25. This second-synchronization information P3 includes the waveform information of the demodulated signal P2, the second-synchronization positions, information indicating that the falling edges are the second-synchronization signal, etc. The transmitting station determining unit 25 input the second-synchronization information P3 to determine whether the waveform of the demodulated signal P2 is coincided with the American demodulated signal pattern or not (step S405). That is, the transmitting station determining unit 25 determines whether a pulse having a pulse width equal to or approximately 200 mS, 500 mS, or 800 mS is present from the second-synchronization positions (positions of the falling edges) and whether a waveform of other pulse widths appears. If it is determined that the standard radio wave is the standard radio wave of America (step S405, Yes), the operation goes to step S410, and if it is determined that the standard radio wave is not the standard radio wave of America (step S405, No), the operation goes to step S406.

If it is determined that the standard radio wave is the standard radio wave of America at step S405 (step S405, Yes), the transmitting station determining unit 25 outputs the transmitting station information P4 to the decoding unit 26. This transmitting station information P4 includes information indicating that the received standard radio wave is the standard radio wave of America. The decoding unit 26 inputs the transmitting station information P4 along with the demodulated signal P2 and the second-synchronization information P3, decodes the demodulated signal P2 with the use of the decoding algorithm corresponding to the time information format of America (step S410), and determines whether the decoding is successful (step S413). If the decoding is successful (step S413, Yes), the time information P5 is output to perform the time correction process (step S414).

That is, the clocking unit 27 inputs the time information P5 to correct the clocking information P6 clocking therein and the clocking information P6 is made coincide with American standard time. The display driving unit 28 inputs the corrected clocking information P6 and outputs the driving signal P7 that drives the display unit 3 and the display unit 3 displays the received American standard time. The time correction mode is then terminated; the clocking unit 27 clocks the clocking information P6; and the display unit 3 displays the time continuously. A series of processes is then terminated. Actually, because of time differences of regions in America (that is, the United States of America), UTC (universal time coordinated) time is used for the standard time in each transmitting station in America. Therefore, to display American local time correctly, time difference correction to UTC is needed (−5 hours to −8 hours or −4 hours to −7 hours in the case of daylight-saving time).

On the other hand, if it is determined that the standard radio wave is not the standard radio wave of America at step S405 (step S405, No), the transmitting station determining unit 25 uses the second-synchronization information P3 already input to determine whether the waveform of the demodulated signal P2 coincides with the demodulated signal pattern of Britain (step S406). That is, the transmitting station determining unit 25 determines whether a pulse having a pulse width equal to or approximately 100 mS, 200 mS, 300 mS, or 500 mS is present from the second-synchronization positions (positions of the falling edges) and whether a waveform of other pulse widths appears. If it is determined that the standard radio wave is the standard radio wave of Britain (step S406, Yes), the operation goes to step S411, and if it is determined that the standard radio wave is not the standard radio wave of Britain (step S406, No), the operation goes to step S407.

If it is determined that the standard radio wave is the British standard radio wave (step S406, Yes), the transmitting station determining unit 25 outputs the transmitting station information P4 to the decoding unit 26. This transmitting station information P4 includes information indicating that the received standard radio wave is the standard radio wave of Britain. The decoding unit 26 inputs the transmitting station information P4 along with the demodulated signal P2 and the second-synchronization information P3, decodes the demodulated signal P2 with the use of the decoding algorithm corresponding to the British time information format (step S411), and determines whether the decoding is successful (step S413), and if the decoding is successful (step S413, Yes), the time information P5 is output to perform the time correction process (step S414).

That is, the clocking unit 27 inputs the time information P5 to correct the clocking information P6 clocking therein and the clocking information P6 is made coincide with the American standard time. The display driving unit 28 inputs the corrected clocking information P6 and outputs the driving signal P7 that drives the display unit 3. The display unit 3 displays the received American standard time. The time correction mode is then terminated; the clocking unit 27 clocks the clocking information P6; and the display unit 3 displays the time continuously. A series of processes is then terminated.

On the other hand, if it is determined that the standard radio wave is not the standard radio wave of Britain at step S406 (step S406, No), since the transmitting station using the falling edges as the second-synchronization signal is not found, the operation goes to step S407 to check whether the second-synchronization signal is present at the rising edges.

Description will be made of the process from step S407. The edge detection circuit 23*a* of the second-synchronization detecting unit 23 inputs the demodulated signal P2 and detects rising edges for a certain period (for example, ten seconds) (step S407). When the edge detection circuit 23*a* detects a first rising edge, the counter 23*b* is reset and the count operation is continued with the clock signal (not shown) until the next rising edge is detected. When the edge detection circuit 23*a* detects the next rising edge, the count operation of the counter 23*b* is stopped; the count data P11 are written into the RAM 24; the counter 23*b* is then reset again; the count operation is continued again until the next rising edge is detected; and this operation is repeated for ten seconds. Consequently, the RAM 24 stores time interval data of the rising edges detected in ten seconds.

The synchronization determination circuit 23*c* of the second-synchronization detecting unit 23 reads the count data P11 stored in the RAM 24, checks how much each of the count data P11 is out of synchronization to one second, and determines whether the rising edges arriving in ten seconds are the second-synchronization signal that is synchronized with one second (step S408). That is, if the number of detection of the rising edges arriving in ten seconds is ten and if the time interval of each falling edge (for example, the count data P11) is equal to or approximately one second, it is determined that the detected falling edges are the second-synchronization signal and that the positions of the rising edges are the second-synchronization positions. However, if the time interval of each rising edge has considerable variation relative to one second, it is determined that the rising edges are not the second-synchronization signal. If it is determined that the rising edges are the second-synchronization signal (step S408, Yes), the operation goes to step S409, and if it is determined that the rising edges are not the second-synchronization signal (step S408, No), the operation goes to step S415.

If it is determined that the rising edges are the second-synchronization signal at step S408 (step S408, Yes), the second-synchronization detecting unit 23 outputs the second-synchronization information P3 to the transmitting station determining unit 25. This second-synchronization information P3 includes the waveform information of the demodulated signal P2, the second-synchronization positions, information indicating that the falling edges are the second-synchronization signal, etc. The transmitting station determining unit 25 inputs the second-synchronization information P3 to determine whether the waveform of the demodulated signal P2 coincides with the demodulated signal pattern of Japan (step S409). That is, the transmitting station determining unit 25 determines whether a pulse having a pulse width equal to or approximately 800 mS, 500 mS, or 200 mS is present from the second-synchronization positions (positions of the rising edges), and whether a waveform with other pulse widths appears. If it is determined that the standard radio wave is the Japanese standard radio wave (step S409, Yes), the operation goes to step S412, and if it is determined that the standard radio wave is not the standard radio wave of Japan (step S409, No), the operation goes to step S415.

On one hand, if it is determined that the standard radio wave is the standard radio wave of Japan at step S409 (step S409, Yes), the transmitting station determining unit 25 outputs the transmitting station information P4 to the decoding unit 26. This transmitting station information P4 includes information indicating that the received standard radio wave is the Japanese standard radio wave. The decoding unit 26 inputs the transmitting station information P4 along with the demodulated signal P2 and the second-synchronization information P3, and decodes the demodulated signal P2 with the use of the decoding algorithm corresponding to the Japanese time information format (step S412), and the operation goes to step S413. The subsequent time correction operation is the same as above and will not be described.

If it is determined that the standard radio wave is not the standard radio wave of Japan at step S409 (step S409, No), it is determined whether another transmitting station is present (step S415), and if another transmitting station (for example, Germany) is present (step S415, Yes), the transmitting station determining unit 25 performs determination of the transmitting station in another country. If it is determined that the standard radio wave is not the standard radio wave of Japan (step S409, No) and if the transmitting station cannot be determined, the controlling unit 22 outputs the reception control signal P10 to the receiving unit 20 that is the reception switching means of the receiving unit 20, controls the tuning unit 20*a* to switch the tuning frequency of the tuning circuit for the reception antenna 4, and controls the reception IC 21 to start the reception operation again from step S401 to receive the standard radio wave from other transmitting stations. In addition to the case that the transmitting station cannot be determined, the reception switching operation for receiving the standard radio wave from other transmitting stations may also be performed when the second-synchronization detecting unit 23 cannot detect the second-synchronization information P3 or when the decoding unit 26 cannot decode the time information of the transmitting station even if the transmitting station determining unit 25 determines the transmitting station. On the other hand, if another transmitting station is not present (step S415, No), it is determined that the reception is impossible and the time correction mode is terminated.

Although the transmitting station determining unit 25 precisely checks the pulse widths of the demodulated signal P2 one by one to determined whether the standard radio wave is transmitted from the corresponding transmitting stations at steps S405, S406, and S409, this determining method is not thus limited, and an arbitrary determining method may be used. The time information formats of Japan and America have a delimiter code called a position marker (P-code) and the transmitting station may be determined by detecting the P-code and using the pulse width of the P-code. For example, the P-code of America has a waveform with a pulse width of 800 mS from the falling edge, and if the transmitting station determining unit 25 detects a pulse waveform equal to or approximately 800 mS, the transmitting station may be immediately determined as the transmitting station of America.

Figure 5:
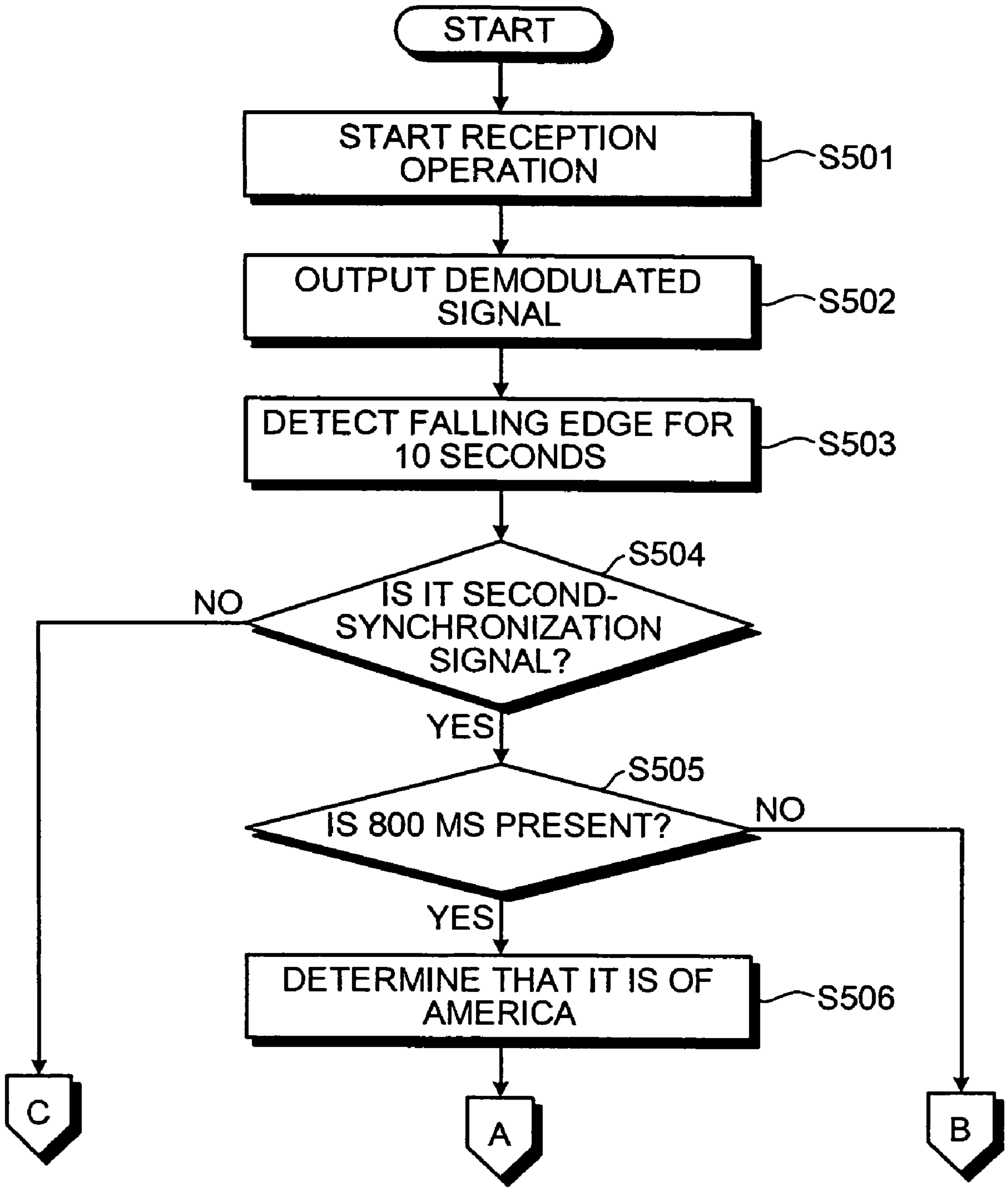
FIG. 5 is a flowchart (part 2) for describing an operation in the first embodiment of the present invention.

In the flowchart of FIG. 5, steps S501 to S504 are the same as steps S401 to S404 shown in the flowchart of FIG. 4 and will not be described. At step S505, it is determined whether a pulse equal to or approximately 800 mS is detected (step S505). If a pulse equal to or approximately 800 mS is detected (step S505, Yes), the transmitting station is immediately determined (decided) as the transmitting station of America (step S506) and the operation goes to step S410 shown in the flowchart of FIG. 4. Since the detected pulse equal to or approximately 800 mS may be noise, only when a plurality of pulses equal to or approximately 800 mS are detected instead of one pulse, the transmitting station may be immediately determined as the transmitting station of America. The transmitting station may be immediately determined as the transmitting station of America only when a plurality of pulses equal to or approximately 800 mS are detected consecutively. On the other hand, if a pulse equal to or approximately 800 mS is not detected (step S505, No), the operation goes to step S406 shown in the flowchart of FIG. 4.

Figure 6:
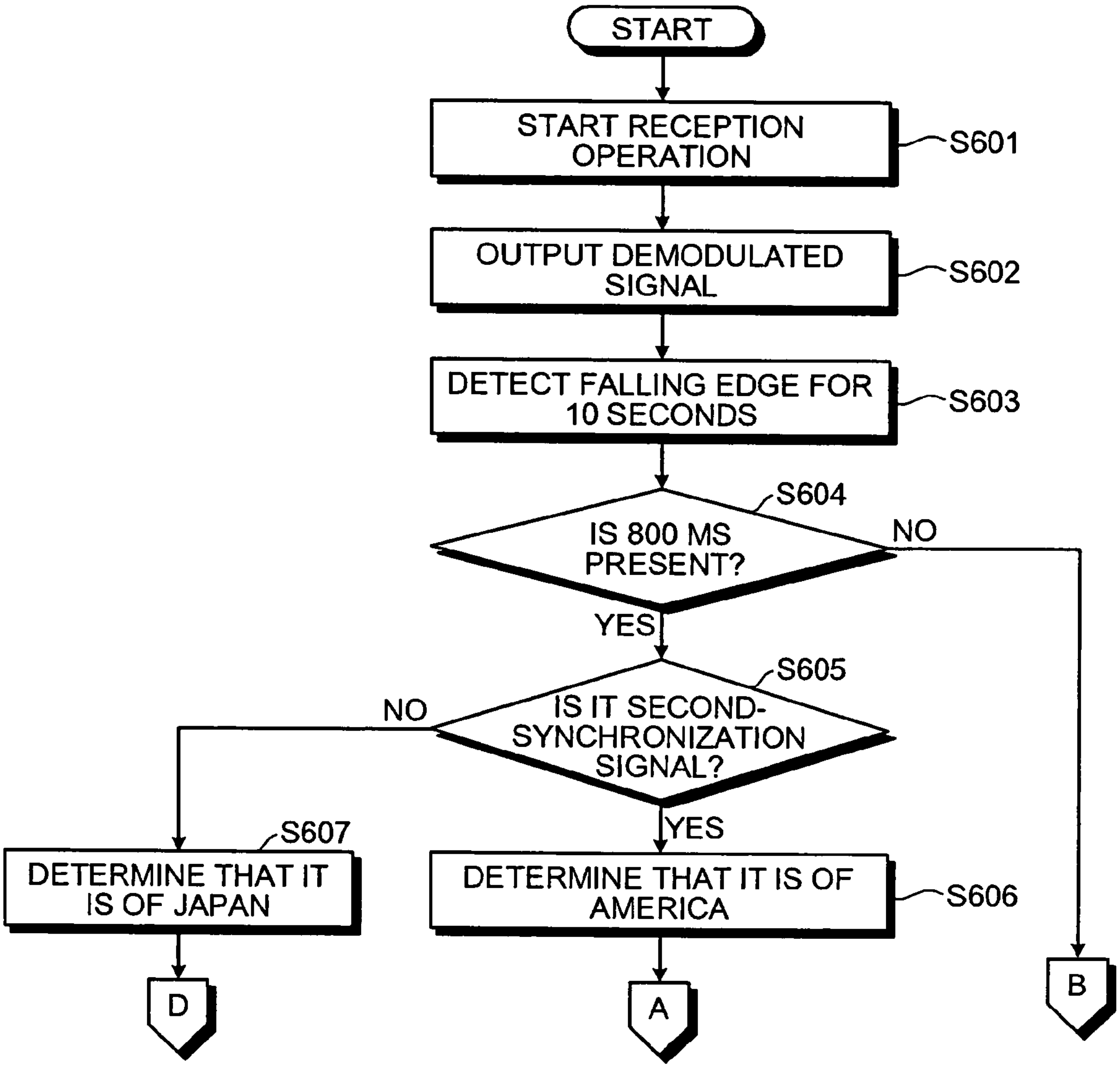
FIG. 6 is a flowchart (part 3) for describing the operation in the first embodiment of the present invention.

The pulse equal to or approximately 800 mS may be detected before it is determined whether the edges are the second-synchronization signal. In the flowchart of FIG. 6, steps S601 to S603 are the same as steps S401 to S403 shown in the flowchart of FIG. 4 and steps S501 to S503 shown in the flowchart of FIG. 5, and will not be described. At step S604, before determining whether the edges are the second-synchronization signal, it is determined whether a pulse equal to or approximately 800 mS is detected (step S604). If a pulse equal to or approximately 800 mS is detected (step S604, Yes), it is determined whether the falling edges arriving in ten seconds are the second-synchronization signal synchronized with one second (step S605). If it is determined that the falling edges are the second-synchronization signal (S605, Yes), the transmitting station is determined as the transmitting station of America (step S606) and the operation goes to step S410 shown in the flowchart of FIG. 4. On the other hand, if it is determined that the falling edges are not the second-synchronization signal (S605, No), the transmitting station is determined as the transmitting station of Japan (step S606) since the P-code of Japan has a waveform with a pulse width of 200 mS from the rising edge. Thus, the P-code of Japan has a waveform with a pulse width of 800 mS from the rising edge to the falling edge, and the operation goes to step S412 shown in the flowchart of FIG. 4.

When the transmitting station determining unit 25 determines the transmitting station, the transmitting station may be determined by focusing attention on a particular waveform of the transmitting station other than the aforementioned position marker. For example, when the received standard radio wave is of Britain or America, as shown in FIG. 2, although the British demodulated signal has a waveform with a pulse width of 300 mS from the falling edge, the demodulated signal of America does not have a pulse width of 300 mS and only has pulse widths of 200 mS, 500 mS, and 800 mS. Therefore, if the transmitting station determining unit 25 detects a pulse equal to or approximately 300 mS, the transmitting station may be immediately determined as the transmitting station of Britain. In this way, the transmitting station can be quickly determined.

Figure 7:
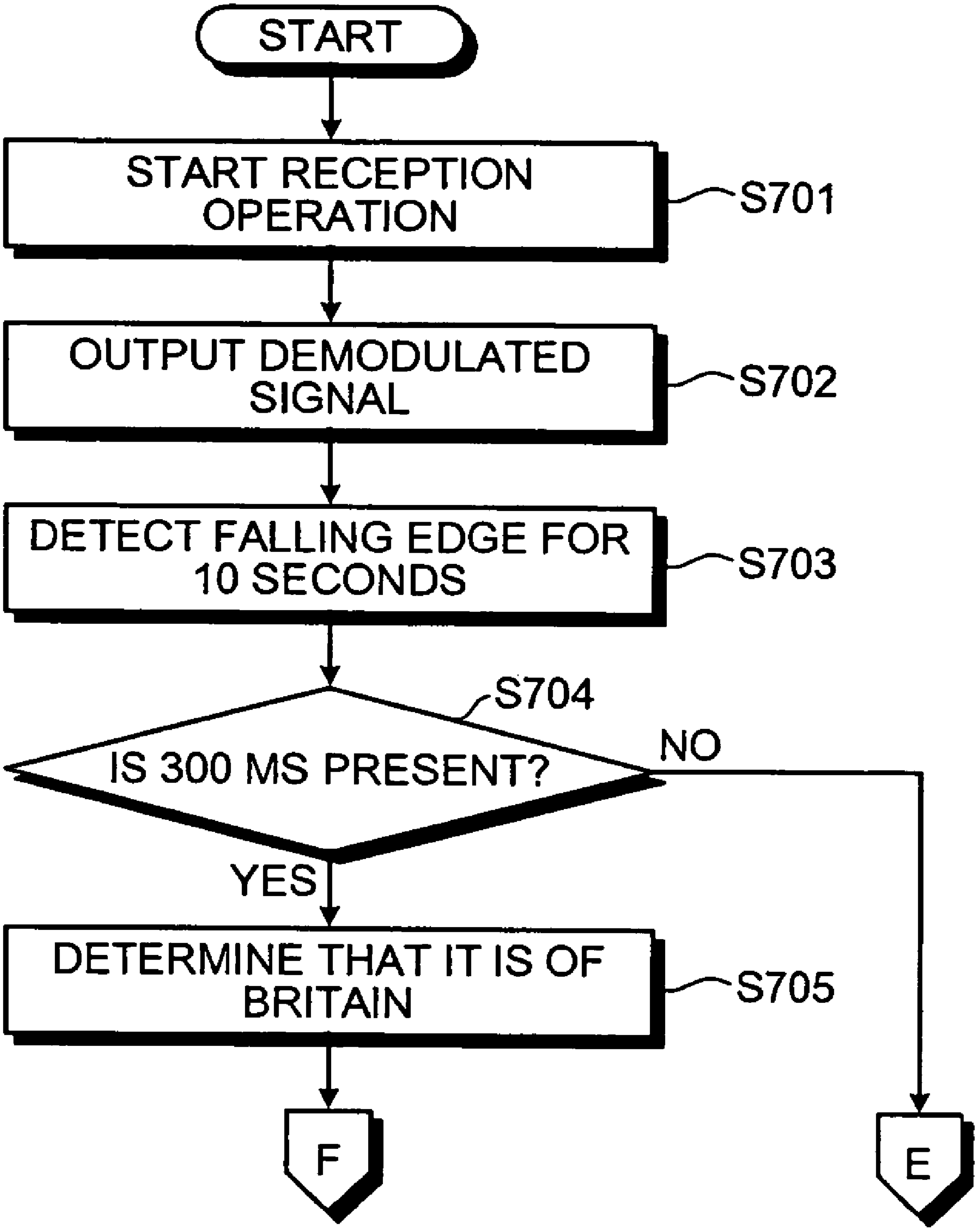
FIG. 7 is a flowchart (part 4) for describing the operation in the first embodiment of the present invention.

In the flowchart of FIG. 7, steps S701 to S703 are the same as steps S401 to S403 shown in the flowchart of FIG. 4 and will not be described. At step S704, without determining whether the edges are the second-synchronization signal, it is determined whether a pulse equal to or approximately 300 mS is detected (step S704). If a pulse equal to or approximately 300 mS is detected (step S704, Yes), the transmitting station is immediately determined as the transmitting station of Britain (step S705) and the operation goes to step S411 shown in the flowchart of FIG. 4. The transmitting station is immediately determined as the transmitting station of Britain when a pulse equal to or approximately a pulse width of 300 mS is detected because a pulse width of 300 mS exists only when the transmitting station is the transmitting station of Britain (see FIG. 2). However, since the detected pulse equal to or approximately 300 mS may be noise, only when a plurality of pulses equal to or approximately 300 mS are detected instead of one pulse, the transmitting station may be immediately determined as the transmitting station of Britain. On the other hand, if a pulse equal to or approximately 300 mS is not detected (step S704, No), the operation goes to step S404 shown in the flowchart of FIG. 4.

As described above, according to the radio controlled timepiece of the present invention, since the standard radio wave can be received from the transmitting stations in various countries and regions to obtain the time information, regardless of whether the frequencies of the standard radio waves are different or the same, whether the second-synchronization is at the rising edge or the falling edge, and even if the time information formats are different, when the user of the radio controlled timepiece travels around countries or regions, the standard radio wave from the transmitting station in each country or region can be automatically received to perform the time correction. Since the second-synchronization detecting unit 23 detects the falling edges and the rising edges of the demodulated signal sequentially, the circuit scale of the edge detection circuit 23*a* in the second-synchronization detecting unit 23 can be simplified, and since the operation flow has a lot of repeated flows and is easily represented by subroutines, the storage capacities can be reduced in the ROM 29 storing firmware and the RAM 24 storing data temporarily, resulting in a low-cost radio controlled timepiece.

Second Embodiment

Description will be made of a configuration of a second embodiment of the present invention with reference to FIG. 3. The circuit configurations of the second embodiment and the above first embodiment are different only in the internal configurations of the edge detection circuit 23*a* and the counter 23*b*. While the edge detection circuit 23*a* of the first embodiment includes only one internal edge detecting unit and the counter 23*b* includes only one internal counter unit, the edge detection circuit 23*a* of the second embodiment includes two internal edge detecting units and the counter 23*b* includes two internal counter units. Such a configuration enables detection of the rising edge and the falling edge of the demodulated signal at the same time. Therefore, the circuit block diagram shown in FIG. 3 can be applicable to the second embodiment.

Description will be made of the operation of the second embodiment of the present invention. Since the operation of the second embodiment is the same as the first embodiment except the operation of the second-synchronization detecting unit 23, the same description will be omitted and only the operation around the second-synchronization detecting unit 23 will be described with reference to a flowchart of FIG. 8.

Figure 8:
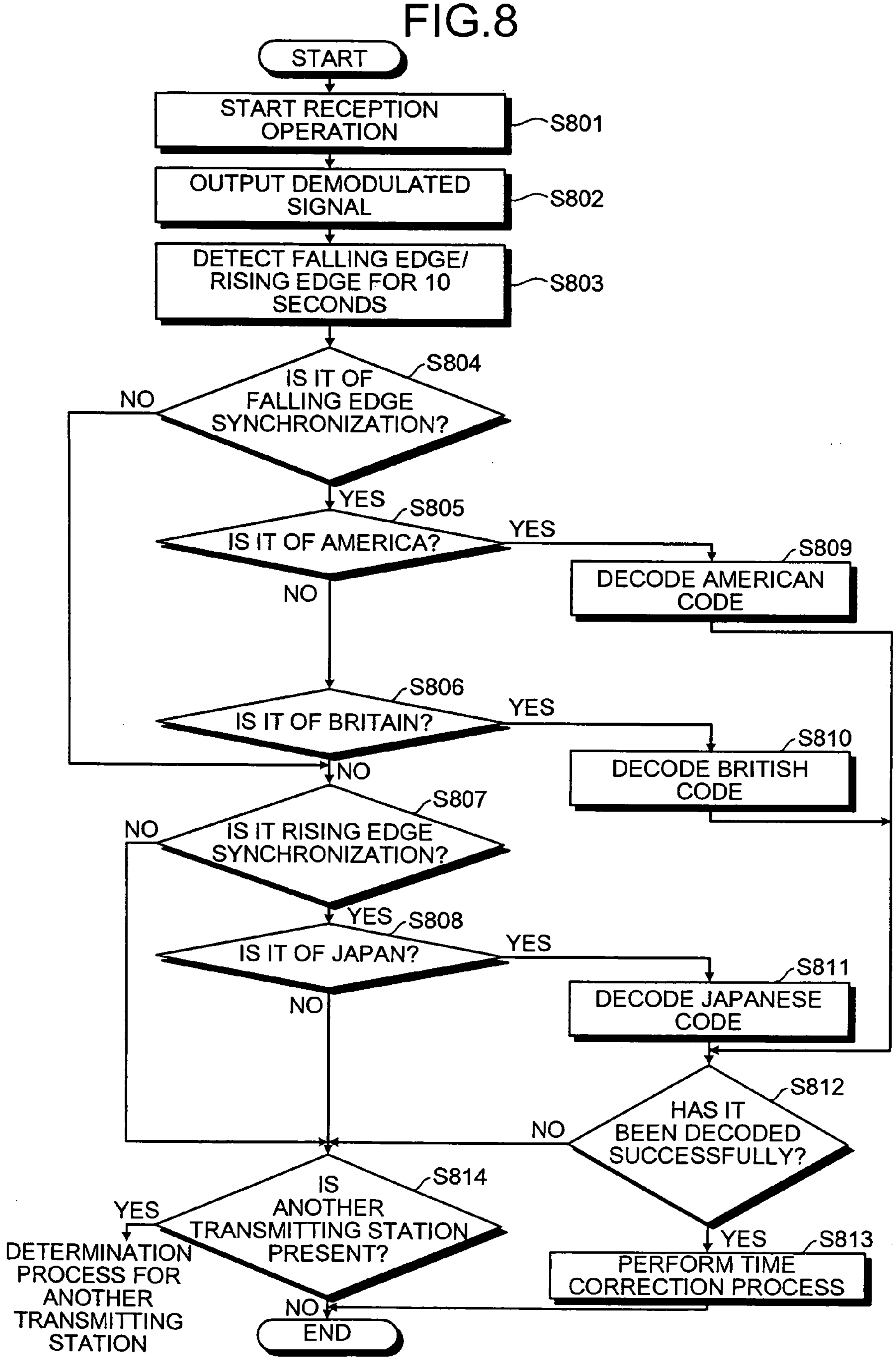
FIG. 8 is a flowchart for describing an operation in the second embodiment of the present invention.

FIG. 8 is a flowchart for describing the operation of the second embodiment of the present invention. In FIG. 8, when the radio controlled timepiece 1 is shifted to the time correction mode, the controlling unit 22 outputs the reception control signal P10 to the receiving unit 20 and the tuning unit 20*a* switches the reception frequency to the frequency specified by the reception control signal P10; and the reception IC 21 starts the reception operation for the standard radio wave (step S801). When the standard radio wave is received by the reception antenna 4, the tuning unit 20*a* outputs the tuning signal P1 and the reception IC 21 inputs and amplifies the tuning signal P1, which is a weak signal, removes noise components, etc. with the filter circuit (not shown), and converts the tuning signal P1 into a digital signal with the decode circuit (not shown) to output the demodulated signal P2 (step S802).

The edge detection circuit 23*a* of the second-synchronization detecting unit 23 inputs the demodulated signal P2 and detects the falling edges and the rising edges with two built-in edge detecting units (not shown) for a certain period (for example, ten seconds) (step S803). When a first edge detecting unit within the edge detection circuit 23*a* detects a first falling edge, a first counter unit (not shown) within the counter 23*b* is reset and the count operation is continued with the clock signal (not shown) until the next falling edge is detected. When the edge detection circuit 23*a* detects the next falling edge, the count operation of the counter 23*b* is stopped; the count data P11 are written into the RAM 24; the counter 23*b* is then reset again; the count operation is continued again until the next falling edge is detected; and this operation is repeated for ten seconds. Consequently, The RAM 24 stores time interval data of the falling edges detected in ten seconds.

As described above, the edge detection circuit 23*a* of the second-synchronization detecting unit 23 performs the rising edge detection concurrently with the falling edge detection. When a second edge detecting unit (not shown) within the edge detection circuit 23*a* detects a first rising edge, a second counter unit (not shown) within the counter 23*b* is reset and the count operation is continued with the clock signal (not shown) until the next rising edge is detected. When the edge detection circuit 23*a* detects the next rising edge, the count operation of the counter 23*b* is stopped; the count data P11 is written into the RAM 24; the counter 23*b* is then reset again; the count operation is continued again until the next rising edge is detected; and this operation is repeated for ten seconds. Consequently, the RAM 24 stores time interval data of the rising edges detected in ten seconds.

The synchronization determination circuit 23*c* of the second-synchronization detecting unit 23 reads the count data P11 that is the time interval data of the falling edges stored in the RAM 24, checks how much each of the count data P11 is out of synchronization to one second, and determines whether the falling edges arriving in ten seconds are the second-synchronization signal that is synchronized with one second (step S804). That is, if the number of detection of the falling edges arriving in ten seconds is ten and if the time interval of each falling edge (for example, the count data P11) is equal to or approximately one second, it is determined that the detected falling edges are the second-synchronization signal and that the positions of the falling edges are the second-synchronization positions. However, if the time interval of each falling edge has considerable variation relative to one second, it is determined that the falling edges are not the second-synchronization signal. If the determination is positive, the operation goes to step S805, and if the determination is negative, the operation goes to step S807.

If the determination is positive at step S804, the second-synchronization detecting unit 23 output the second-synchronization information P3 to the transmitting station determining unit 25. This second-synchronization information P3 includes the waveform information of the demodulated signal P2, the second-synchronization positions, information indicating that the falling edges are the second-synchronization signal, etc. The transmitting station determining unit 25 inputs the second-synchronization information P3 to determine whether the waveform of the demodulated signal P2 coincides with the demodulated signal pattern of America (step S805). That is, the transmitting station determining unit 25 determines whether a pulse having a pulse width equal to or approximately 200 mS, 500 mS, or 800 mS is present from the second-synchronization positions (positions of the falling edges) and whether a waveform of other pulse widths appears. If the determination is positive (determined as the standard radio wave of America), the operation goes to step S809, and if the determination is negative, the operation goes to step S806.

Although the operation goes to step S809 if the determination is positive at step 805, since step S809 and steps S812 to S814 are the same as step S410 and steps S413 to S415 in the flowchart of the first embodiment shown in FIG. 4, the description will be omitted.

Description will be made of step S806 when the determination is negative at step 805. The transmitting station determining unit 25 uses the second-synchronization information P3 already input to determine whether the waveform of the demodulated signal P2 coincides with the demodulated signal pattern of Britain (step S806). That is, the transmitting station determining unit 25 determines whether a pulse having a pulse width equal to or approximately 100 mS, 200 mS, 300 mS, or 500 mS is present from the second-synchronization positions (positions of the falling edges) and whether a waveform with other pulse widths appears. If the determination is positive (determined as the standard radio wave of Britain), the operation goes to step S910, and if the determination is negative, the operation goes to step S807.

Although the operation goes to step S810 if the determination is positive at step 806, since step S810 and steps S812 to S814 are the same as step S411 and steps S413 to S415 in the flowchart of the first embodiment shown in FIG. 4, the description will be omitted.

If the determination is negative at step S806, since the transmitting station using the falling edges as the second-synchronization signal is not found, the operation goes to step S807 to check whether the second-synchronization signal is present at the rising edges. This operation flow is not thus limited and if possibility of other countries (for example, Germany) exists, the transmitting station determining unit 25 may further perform the determination for the transmitting stations in other countries. When a country using the falling edges as the second-synchronization signal is not found, the time correction mode may be terminated without going to step S808. Step S807 is also performed when the determination is negative at step S804.

Description will be made of the process from step S807. The synchronization determination circuit 23*c* of the second-synchronization detecting unit 23 reads the count data P11 that is the time interval data of the rising edges stored in the RAM 24, checks how much each of the count data P11 is out of synchronization to one second, and determines whether the rising edges arriving in ten seconds are the second-synchronization signal that is synchronized with one second (step S807). That is, if the number of detection of the rising edges arriving in ten seconds is ten and if the time interval of each rising edge (for example, the count data P11) is equal to or approximately one second, it is determined that the detected rising edges are the second-synchronization signal and that the positions of the rising edges are the second-synchronization positions. However, if the time interval of each falling edge has considerable variation relative to one second, it is determined that the rising edges are not the second-synchronization signal. If the determination is positive, the operation goes to step S808, and if the determination is negative, the operation goes to step S814.

If the determination is positive at step S807, the second-synchronization detecting unit 23 outputs the second-synchronization information P3 to the transmitting station determining unit 25. This second-synchronization information P3 includes the waveform information of the demodulated signal P2, the second-synchronization positions, information indicating that the rising edges are the second-synchronization signal, etc. The transmitting station determining unit 25 inputs the second-synchronization information P3 to determine whether the waveform of the demodulated signal P2 coincides with the demodulated signal pattern of Japan (step S808). That is, the transmitting station determining unit 25 determines whether a pulse having a pulse width of equal to or approximately 800 mS, 500 mS, or 200 mS from the second-synchronization positions (positions of the rising edges) and whether a waveform of other pulse widths appears. If the determination is positive (determined as the standard radio wave of Japan), the operation goes to step S811; if the determination is negative, the operation goes to step S814; if possibility of the standard radio wave of other countries exists, the transmitting station determining unit 25 may further perform the determination for the transmitting stations in other countries.

Although the operation goes to step S811 if the determination is positive at step 808, since steps S811 to S814 are the same as steps S412 to S415 in the flowchart of the first embodiment shown in FIG. 4, the description will be omitted. It is determined first whether the detected falling edges are the second-synchronized signal, and then, step S803 is performed in the flowchart of FIG. 8. However, this operation flow is not thus limited and it may be determined first whether the rising edges are the second-synchronized signal.

As described above, according to the second embodiment of the present invention, since the falling edge and the rising edge of the demodulated signal P2 are detected at the same time, although the circuit scale of the second-synchronization detecting unit 23 increases to some extent, the second-synchronization information can be quickly detected and the transmitting station of the received standard radio wave can be rapidly determined, resulting in a great effect on shortening the time of the time correction mode.

The synchronization determination circuit 23*c* of the second-synchronization detecting unit 23 may compare the time interval data of the rising edges and the time interval data of the falling edges that are the second-synchronization information stored in the RAM 24 and may calculate the edge direction with less error relative to one second to prioritize the determination order of the transmitting station determining unit 25. For example, at step S804, when the time interval data of the rising edges and the time interval data of the falling edges stored in the RAM 24 are compared to calculate the edge direction with less error relative to one second, if the time interval data of the rising edges have less error relative to one second, the operation may go to the determination whether the standard radio wave is the standard radio wave of Japan (for example, step S807) and if the time interval data of the falling edges have less error relative to one second, the operation may go to the determination whether the standard radio wave is the standard radio wave of America or not (for example, step S805) to generate the operation flow with the prioritize determination order. If the determination order of the transmitting station determining unit 25 is prioritized in this way, the transmitting station of the received standard radio wave can be determines more efficiently and quickly. For example, if the falling edges are determined to be the second-synchronization, the priority may be set such that the standard radio wave is received from a transmitting station (for example, of America) from which reception is successfully performed last time, by providing a memory (for example, the RAM 24) that stores such transmitting station for which the reception is successfully performed last time.

Third Embodiment

Figure 9:
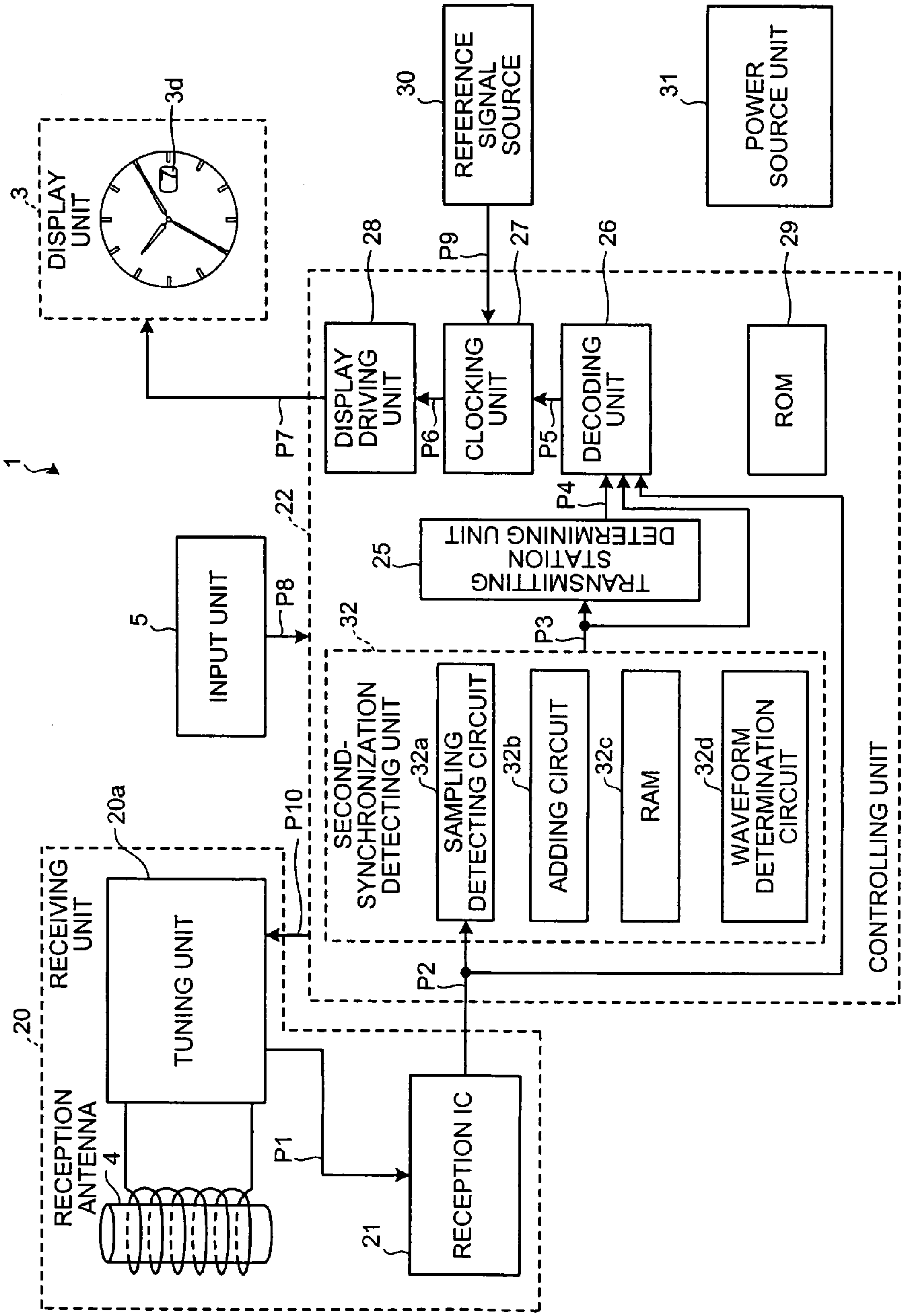
FIG. 9 is a circuit block diagram of a radio controlled timepiece according to a third embodiment of the present invention.

With reference to FIG. 9, description will be made of an outline of a circuit configuration of the radio controlled timepiece 1 of a third embodiment of the present invention. Since the circuit configuration of the third embodiment is only different in second-synchronization detecting unit from the first and second embodiments, the same numbers are added to other same components and the description will be omitted. A numeral 32 is second-synchronization detecting unit of the third embodiment that is constituted by a sampling detection circuit 32*a* as a sampling detecting unit, an adding circuit 32*b* as an adding unit, a RAM 32*c* as a storing unit, and a waveform determination circuit 32*d* as a waveform determining unit.

The sampling detection circuit 32*a* inputs the demodulated signal P2 to sample and detect the rising edges and the falling edges of the demodulated signal P2 at regular intervals (for example, 1/64-second cycles). The adding circuit 32*b* adds up the number of times of detection of the rising edges and the falling edges detected by the sampling detection circuit 32*a* individually for each sampling position. The numbers of times of detection of the rising edges and the falling edges added by the adding circuit 32*b* individually for each sampling position are stored in the RAM 32*c* individually for each sampling position. The waveform determination circuit 32*d* reads the numbers of times of detection of the rising edges and the falling edges stored in the RAM 32*c* individually for each sampling position, determines that the second-synchronization positions of the demodulated signal P2 are the sampling positions where the number of times of detection is a constant value or more, and determines that the edge direction thereof is the edge direction of the second-synchronization signal. The second-synchronization information P3 output by the second-synchronization detecting unit 32 includes the wave form information of the demodulated signal P2 and the determined second-synchronization positions and edge direction of the demodulated signal P2.

Figure 10:
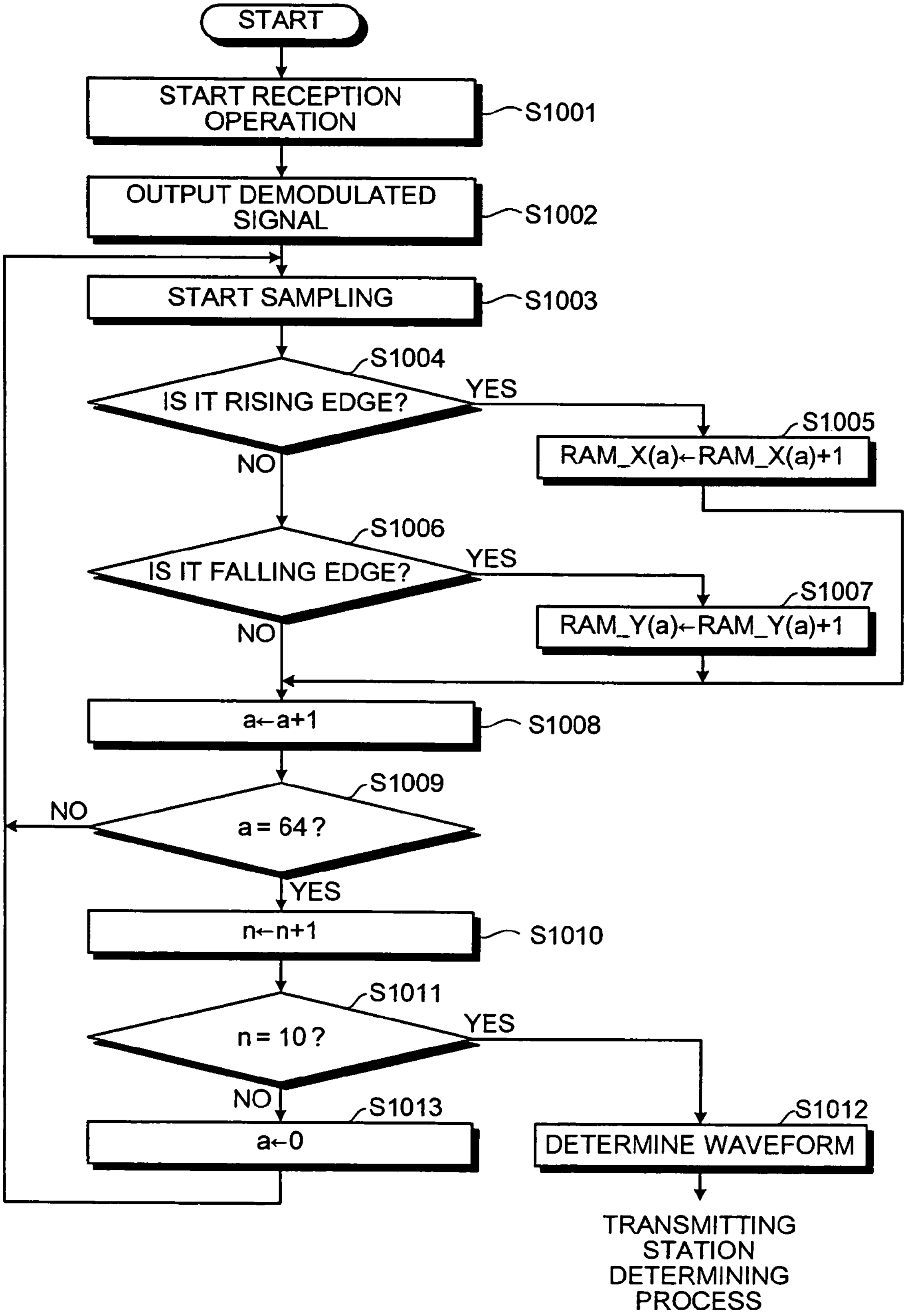
FIG. 10 is a flowchart for describing an operation in the third embodiment of the present invention.

Description will be made of the operation flow of the third embodiment of the present invention, focusing on the second-synchronization operation, with reference to a flowchart of FIG. 10. When the radio controlled timepiece 1 is shifted to the time correction mode by the manipulation of the user or by the timer, etc., the controlling unit 22 outputs the reception control signal P10 to the receiving unit 20; the tuning unit 20*a* switches the reception frequency to the frequency specified by the reception control signal P10; and the reception IC 21 starts the reception operation for the standard radio wave (step S1001). At step S1001, initialization is performed for a pointer a that is a variable acting as an address pointer described later, the number of times n that is a variable for counting the number of cycles of the sampling detection, and an X region and a Y region of the RAM 32*c* that respectively store the numbers of times of detection of the rising edges and the falling edges and each of the values is set to zero.

When the standard radio wave is received by the reception antenna 4, the tuning unit 20*a* outputs the tuning signal P1 and the reception IC 21 inputs and amplifies the tuning signal P1, which is a weak signal, removes noise components, etc. with the filter circuit (not shown), and converts the tuning signal P1 into a digital signal with the decode circuit (not shown) to output the demodulated signal P2 (step S1002).

The sampling detection circuit 32*a* of the second-synchronization detecting unit 32 inputs the demodulated signal P2 and starts the sampling operation (step S1003) to detect the rising edge or the falling edge.

It is determined whether the rising edge is detected by the sampling operation of the sampling detection circuit 32*a* (step S1004). If the determination is positive, the operation goes to step S1005, and if the determination is negative, the operation goes to step S1006.

If the determination is positive at step S1004 (for example, if the rising edge is detected), the adding circuit 32*b* reads data of an address indicated by the pointer a in the X region of the RAM 32*c* (shown by RAM_X(a)) and adds 1 to the read data, which is stored again at the address indicated by the pointer a in the X region of the RAM 32*c* (step S1005), and the operation goes to step S1008.

If the determination is negative at step S1004, it is determined whether the falling edge is detected by the sampling operation of the sampling detection circuit 32*a* (step S1006). If the determination is positive, the operation goes to step S1007, and if the determination is negative, the operation goes to step S1008.

If the determination is positive at step S1006 (for example, if the falling edge is detected), the adding circuit 32*b* reads data of an address indicated by the pointer a in the Y region of the RAM 32*c* (shown by RAM_Y(a)) and adds one to the read data, which is stored again at the address indicated by the pointer a in the Y region of the RAM 32*c* (step S1007), and the operation goes to step S1008.

The adding circuit 32*b* adds one to the pointer a, which is an address pointer for the X region and the Y region of the RAM 32*c*, to advance the address pointer by one (step S1008).

The second-synchronization detecting unit 32 determines whether the pointer a is equal to a constant value (for example, 64) (step S1009). If the determination is positive, the operation goes to step S1010, and if the determination is negative, the operation returns to step S1003. The constant value is a value corresponding to the sampling cycle of step S1003; if the sampling cycle is 1/64 second, the constant value is 64; and if the sampling cycle is 1/32 second, the constant value is 32.

If the determination is negative at step S1009, the operation flow returns to step S1003 and if the sampling cycle is 1/64 second, the next sampling operation is started after 1/64 second (step S1003) to detect the rising edge or the falling edge. The operation flow is subsequently repeated until the positive determination is made at step S1009. That is, the operation from step S1003 to step S1009 is repeated 64 times, and as a result, the rising edges and the falling edges are detected by each of the 1/64-second sampling operation for a period of one second, which is one cycle of the demodulated signal P2.

If the determination is positive at step S1009, the adding circuit 32*b* adds one to the number of times n that indicates what number of cycles of the demodulated signal P2 is sampled and detected (step S1010).

The second-synchronization detecting unit 32 determines whether the number of times n is equal to a constant value (for example, ten) (step S1011). If the determination is positive, the operation goes to step S1012, and if the determination is negative, the operation returns to step S1013. If the constant value is ten, the rising edges and the falling edges are detected for ten cycles of the demodulated signal P2, for example, for ten seconds and this constant value may be changed arbitrarily.

If the determination is negative at step S1011, the pointer a is set to zero to reset the address pointer of the RAM 32*c* (step S1013). The operation returns to step S1003. The operation flow is subsequently repeated until the positive determination is made at step S1011. That is, if the constant value at step S1011 is ten, as described above, the sampling operation is repeatedly performed for ten cycles of the demodulated signal P2. As a result, in the X region and the Y region of the RAM 32*c*, the numbers of times of detection of the rising edges and the falling edges in ten cycles are summed up and stored for each sampling position If the determination is positive at step S1011, the waveform determination circuit 32*d* reads the number of times of detection of the rising edges and the number of times of detection of the falling edges for each sampling position stored in the X region and the Y region of the RAM 32*c*, determines that the second-synchronization positions of the demodulated signal P2 are the sampling positions where the number of times of detection is a constant value or more, and determines that the edge direction thereof is the edge direction of the second-synchronization signal (step S1012).

Description will be made of the operation of step S1012 of the waveform determination circuit 32*d* with reference to FIGS. 11-1 to 11-3.

Figures 1, 11:
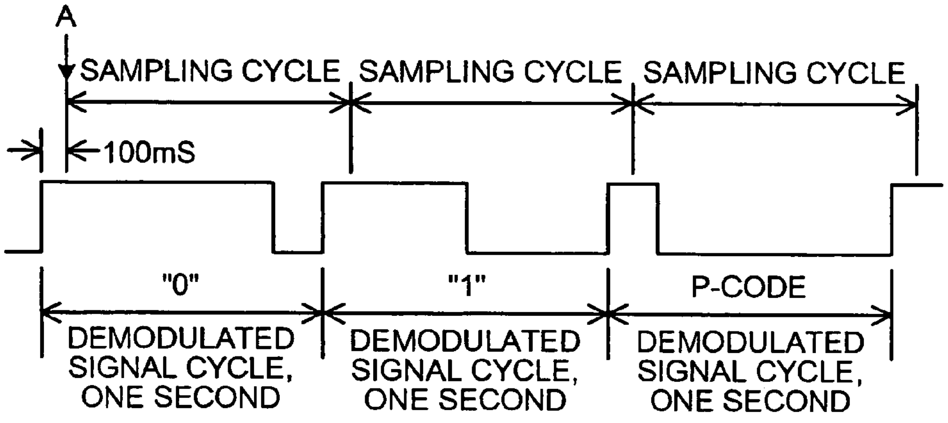
Figures 2, 11:
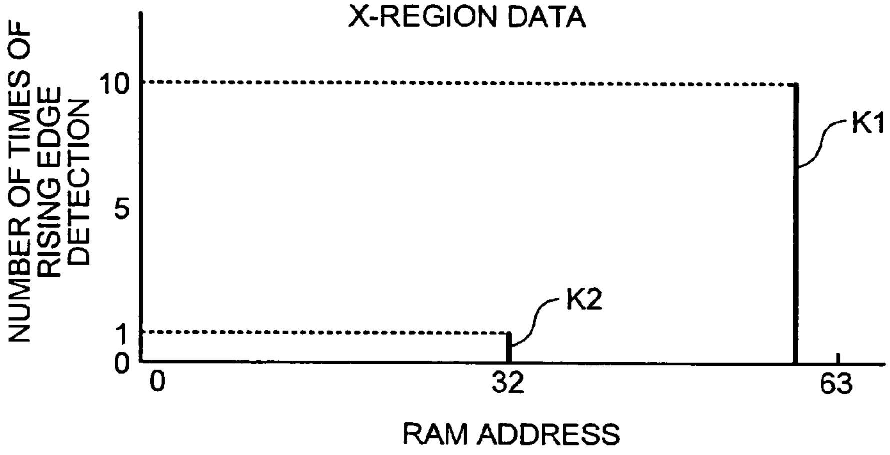
Figures 3, 11:
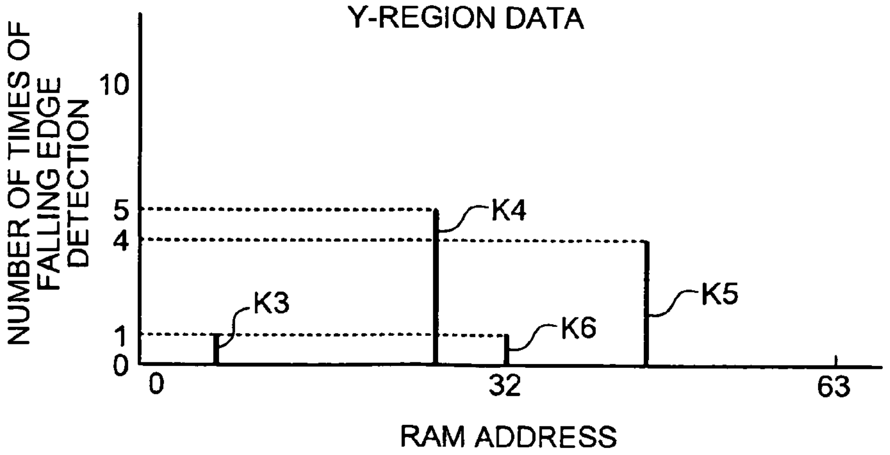

FIG. 11-1 is an explanatory diagram of the demodulated signal and sampling relationship in the standard radio wave of Japan in relation to the operation of the waveform determination circuit of the second-synchronization detecting unit in the third embodiment of the present invention; FIG. 11-2 is an explanatory diagram in which the number of times of detection of the rising edges is expressed in a graph in relation to the operation of the waveform determination circuit of the second-synchronization detecting unit in the third embodiment of the present invention, for example, a diagram of graphic representation for the number of times of detection of the rising edges stored in the X region of the RAM 32*c*; and FIG. 11-3 is an explanatory diagram in which the number of times of detection of the falling edges is expressed in a graph in relation to the operation of the waveform determination circuit of the second-synchronization detecting unit in the third embodiment of the present invention, for example, a diagram of graphic representation for the number of times of detection of the falling edges stored in the Y region of the RAM 32*c*.

JJY of Japan is an example of the standard radio wave from which the second-synchronization information is detected and it is assumed that the waveform pattern of the demodulated signal P2 thereof is a waveform shown in FIG. 11-1. The sampling detection circuit 32*a* samples the demodulated signal P2 for ten cycles, and the first sampling start point is determined at random relative to the demodulated signal P2 since the point is asynchronous with the demodulated signal P2.

When it is assumed that the sampling start position is a point shown by an arrow A after about 100 mS from the second-synchronization position (for example, the rising position) of the demodulated signal P2 shown in FIG. 11-1, the relationship between the demodulated signal P2 and the sampling cycles is as shown in FIG. 11-1. X-axes of graphs of FIGS. 11-2 and 11-3 are addresses of the RAM 32*c* and the address ranges thereof are 0 to 63, which is equal to the number of sampling times in one cycle of the demodulated signal P2. That is, an address 0 of the RAM 32*c* corresponds to the sampling start position shown be the arrow A of FIG. 11-1 and each address of the RAM 32*c* corresponds to a sampling position. Y-axes of the graphs are the numbers of times of detection of the rising edges and the falling edges stored in the RAM 32*c*.

Detection data K1 of FIG. 11-2 are located near an address 58 of the X region of the RAM 32*c* and the size thereof is equal to ten. That is, the detection data K1 indicates that the rising edges of the demodulated signal shown in FIG. 11-1 are detected exactly ten times. Similarly, detections data K2 is located near an address 32 and the size thereof is 1. The detection data K2 are a result of summed noise components mixed in the demodulated signal P2.

Detection data K3 of FIG. 11-3 is located near an address 6 and the size thereof is 1. The detection data K3 is the detected falling edge of the position marker (P-code) and since the P-code is generated once in ten seconds except 00 second, the number of times of detection is 1. Detection data K4 is located near an address 26 and the size thereof is 5. The detection data K4 is the detected falling edges having logic "1" and the number of times of detection is 5. Detection data K5 is located near an address 45 and the size thereof is 4. The detection data K5 is the detected falling edges having logic "0" and the number of times of detection is 4. Detection data K6 is located near an address 32 and the size thereof is 1. The Detection data K6 is a result of summed noise components mixed in the demodulated signal P2. The detection data K4 and K5 very depending on the logic of the demodulated signal P2 and the detection data K2 and K6 due to the noise changes in the detection positions and the number of times of detection, of course.

The waveform determination circuit 32*d* inspects the storage content in the X region and the Y region of the RAM 32*c* shown in FIGS. 11-2 and 11-3, determines that the second-synchronization position of the demodulated signal is the sampling position (for example, the address position of the RAM 32*c*) of the detection data with the largest number of detection, and determines that the detected edge direction is the edge direction of the second-synchronization position. That is, in this example, it is determined that the address 58 is the second-synchronization position and that the edge direction is the rising edge. The constant value may be determined arbitrarily for the number of times of detection that determines the second-synchronization position and, in one example, if the detection time is ten seconds, it may be determined that the second-synchronization position is the detection data with nine or more detection times. If the rising edge or the falling edge is detected due to noise as in the detection data K2 and K6, since the noise is not likely to be mixed repeatedly at the same sampling position, it is understood that the rising edge or the falling edge generated by the mixed noise is extremely unlikely to be determined as the second-synchronization signal by determining the number of times of detection for each sampling position.

Figures 1, 12:
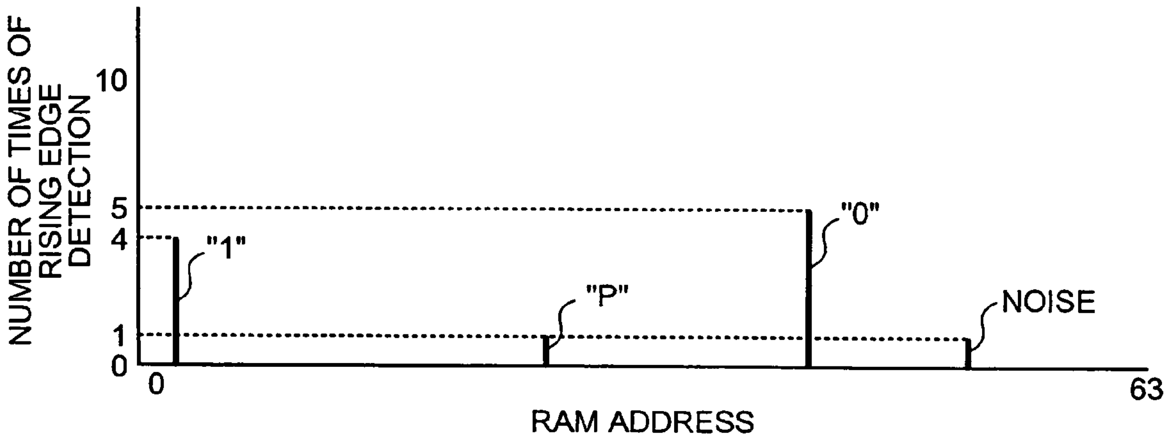
Figures 2, 12:
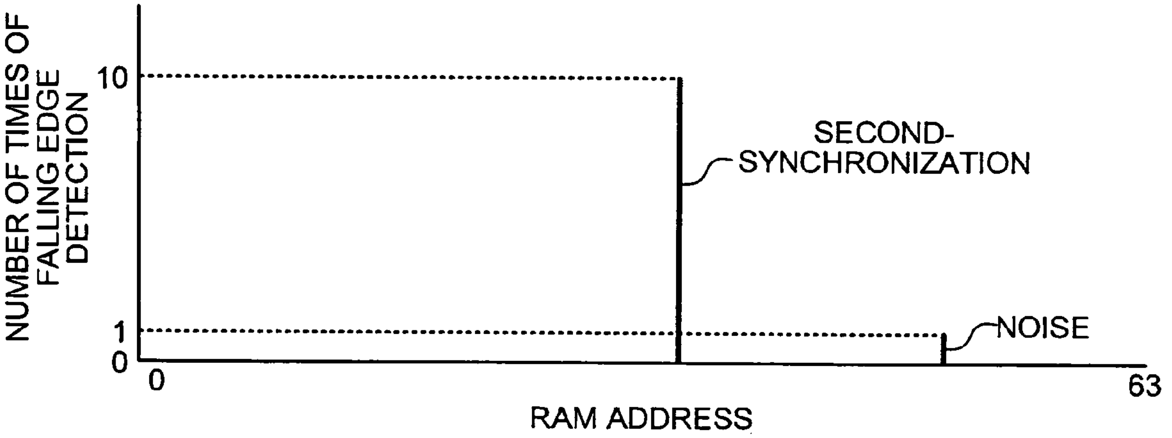
Figures 1, 13:
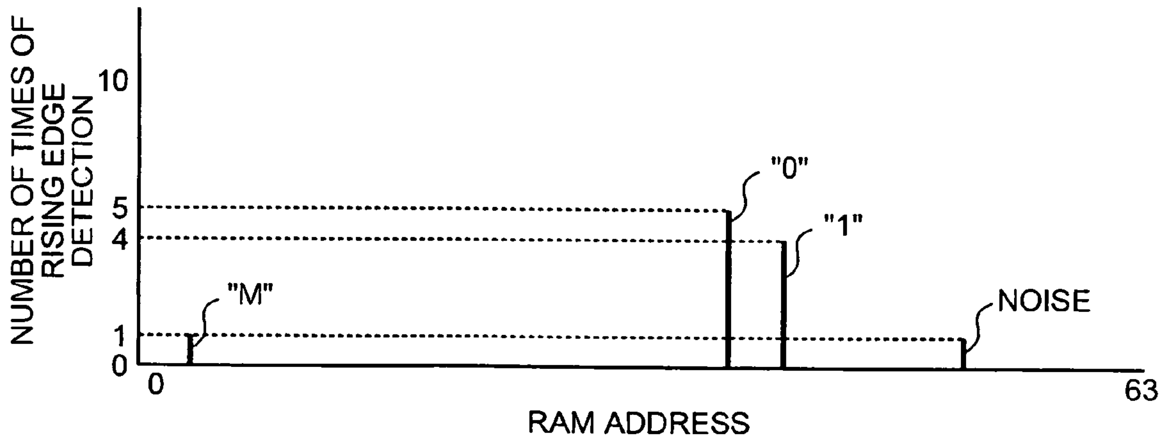
Figures 2, 13:
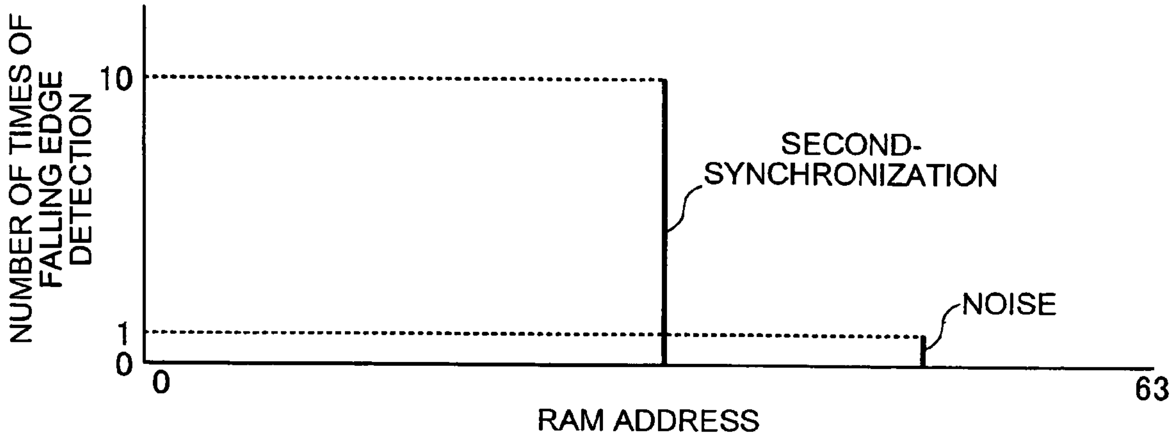

FIG. 12-1 is an explanatory diagram in which the number of times of detection of the rising edges is in the standard radio wave of the America station is expressed in a graph, and FIG. 12-2 is an explanatory diagram in which the number of times of detection of the falling edges in the standard radio wave of the America station is expressed in a graph. FIG. 13-1 is an explanatory diagram in which the number of times of detection of rising edges in the standard radio wave of a Britain station is expressed in a graph and FIG. 13-2 is an explanatory diagram in which the number of times of detection of falling edges in the standard radio wave of the Britain station is expressed.

As shown in FIGS. 12-1, 12-2, 13-1, and 13-2, when the rising edges are detected, respective different characteristics (patterns) appear in the America station and the Britain station. The transmitting station may be determined based on these different characteristics. Specifically, the feature (pattern) appearing only in America and the feature appearing (pattern) only in Britain are stored and when coincided with the relevant patter, one of the transmitting stations is determined. In this way, since the determination may be made from the coincidence of the patterns, the second-synchronization may not be established.

The transmitting station determining unit 25 inputs the second-synchronization information P3 including the wave form information of the demodulated signal P2, the second-synchronization position, and the edge direction and analyze the second-synchronization position based on the demodulated signal P2 to determine the transmitting station. The operation flow of the transmitting station determining unit 25 is the same as, for example, the operation from S805 of the flowchart of the second embodiment shown in FIG. 8 and will not be described here.

As described above, according to the third embodiment of the present invention, since the second-synchronization detecting unit 32 detects the second-synchronization information based on the result of the summed numbers of times of detection of the rising edges and the falling edges for each sampling position in the demodulated signal P2, if the rising edge or the falling edge is generated due to the noise in the demodulated signal P2, it can be determined from the number of times of generation that the detection data are the noise and, therefore, the second-synchronization detection can be achieved, which is less affected by the noise even in the case of the standard radio wave under a noisy environment, to provide the radio controlled timepiece with excellent performance in the detection of the standard radio wave.

Fourth Embodiment

A fourth embodiment of the present invention will be described. Since a circuit configuration of the fourth embodiment is the same as the third embodiment, only the operation specific to the fourth embodiment will be described based on FIG. 9. In FIG. 9, the sampling detection circuit 32*a* is the sampling detecting unit of the second-synchronization detecting unit and is added with a function for sampling a logic level (logic "1" or logic "0") of the demodulated signal P2 at regular intervals. The adding circuit 32*b* is the adding means and adds up the number of times of detection of the logic level (either logic "1" or logic "0") sampled by the sampling detection circuit 32*a*. For example, if the sampling detection circuit 32*a* samples the logic "1", the adding circuit 32*b* adds up the number of times of detection of the logic "1" sequentially every time the sampling detection circuit 32*a* detects the logic "1".

The second-synchronization detecting unit 32 calculates a rate of the logic levels of the sampled demodulated signal P2, for example, a rate of the numbers of times of detection of the logic "1" and the logic "0". For example, if the sampling detection circuit 32*a* samples the demodulated signal P2 at 1/64-second intervals for one second and if the adding circuit 32*c* adds up the number of times of detection of the logic "1" to 40, since the number of times of detection of the logic "0" is supposed to be 64−40=24 times, the rate of the logic levels in the demodulated signal P2 is calculated to be 40:24, and this logic level rate information is included in the second-synchronization information P3 output from the second-synchronization detecting unit 32 and is input to the transmitting station determining unit 25. The sampling period for obtaining the logic level rate information is not limited and, for example, the rate of the logic levels may be calculated by performing the sampling and the addition for ten seconds.

The transmitting station determining unit 25 inputs the second-synchronization information P3 and determines the transmitting station based on the logic level rate information included in the second-synchronization information P3. For example, if it is determined that the standard radio wave received by the radio controlled timepiece is a second-synchronization signal using the falling edges and if an anticipated transmitting station is either of the American or transmitting station of Britain, the fourth embodiment of the present invention may be used. That is, since the demodulated signal P2 of America has a minimum pulse width of 200 mS as shown in FIG. 2, the rate of the logic "1" to the logic "0" in the demodulated signal P2 does not become greater than 8:2, for example, 4/1. On the other hand, since the demodulated signal P2 of Britain has a minimum pulse width of 100 mS, the rate of the logic "1" to the logic "0" in the demodulated signal P2 may become greater than 8:2, for example, 4/1. For example, if the calculated logic level rate is 8.5:1.5, it can be determined that the received standard radio wave is that of the transmitting station of Britain.

As described above, according to the fourth embodiment of the present invention, since the second-synchronization detecting unit 32 sample the demodulated signal P2; the logic level rate in the demodulated signal P2 is calculated from the result of summing the number of times of detection of the logic "1" or the logic "0"; and the transmitting station is immediately determined from the logic level rate, the determination of the transmitting station can be performed more quickly as compared to the technique of determining the transmitting station by checking pulse widths of the demodulated signal one by one, and the time correction mode can be accelerated.

Fifth Embodiment

In the first to fourth embodiments, when the receiving unit 20 starts receiving, if the standard radio waves exist at a plurality of frequencies, the standard radio wave of the last successfully received transmitting station may be received first. If the reception of the standard radio wave fails once or a plurality of times set in advance, switching can be performed to receive the standard radio wave with another frequency. In this way, the time correction process can be completed more quickly when the user does not travels around countries or regions.

The RAM 24 stores information about the transmitting stations for which reception is successfully performed in the past. When the reception is started or when the reception is switched, the determination may be performed based on the information about the transmitting stations stored in the RAM 24 for the frequency of the standard radio wave received first or for the order of switching the reception. For example, the transmitting station with the largest number of times of storage can be received first, and the reception can be switched in the descending order of the number of times. The RAM 24 may also store information about dates of successful reception and the switching order may be determined based on the dates and the number of times. Therefore, the switching may be performed in the order from the latest successful reception or the switching may be performed in the descending order from the most successful transmitting station in a certain number of times of recent reception. The order of reception may be determined by the input from the operator. Therefore, the reception can be performed in a suitable order depending on the status of use (such as the status of traveling overseas) of the operator.

In this way, according to the radio controlled timepiece of the present invention, since the standard radio waves can be received from the transmitting stations in two or more countries or regions to obtain time information, if the user of the radio controlled timepiece travels around countries or regions, the standard radio wave can always be automatically received from the transmitting station in each country or region to perform the time correction.

If the time information cannot be received from the received standard radio wave, since the standard radio wave can be received from another transmitting station by the reception switching means, the transmitting station optimum for reception can be selected and the radio controlled timepiece with excellent reception performance can be provided.

Since the standard radio waves composed of the same frequency can be received from the transmitting stations in two or more countries or regions to obtain time information, if the user of the radio controlled timepiece travels around countries or regions, the standard radio wave can always be automatically received from the transmitting station in each country and region to perform the time correction.

Since the falling edges and the rising edges of the demodulated signal are detected sequentially, the circuit scale of the second-synchronization detecting unit can be simplified. Since the second-synchronization detecting unit detects the rising edge and the falling edge of the demodulated signal at the same time, the second-synchronization information can be quickly detected and the transmitting station of the received standard radio wave can be rapidly determined.

Since the second-synchronization detecting unit obtains the second-synchronization information based on the result of summing the numbers of times of detection of the rising edges and the falling edges for each sampling position in the demodulated signal, if noise is mixed in the demodulated signal and if the rising edge or the falling edge is generated due to the noise, the second-synchronization detection less affected by the noise can be performed.

Since the transmitting station determining unit determines the transmitting station based on the result of summing the logic "1" or the logic "0" in the demodulated signal, which is summed by the second-synchronization detecting unit, the transmitting station of the received standard radio wave can be determined efficiently and quickly.

Since the transmitting station determining unit determines the transmitting station from the waveform of the position marker arriving at a constant cycle, the transmitting station of the received standard radio wave can be determined efficiently and quickly. Since the transmitting station determining unit determines the transmitting station from a particular waveform of the demodulated signal, the transmitting station of the received standard radio wave can be determined efficiently and quickly.

Since the second-synchronization detecting unit prioritizes the order of the determination of the transmitting station by the transmitting station determining unit, the transmitting station determining unit can determine the transmitting station of the received standard radio wave efficiently and quickly.

Each flowchart of the embodiments of the present invention is not thus limited and the operation flow can be modified arbitrarily as long as each function is satisfied. Although the embodiments of the present invention provide the analog display radio controlled timepiece, it is not thus limited and a digital display or an analog/digital combined radio controlled timepiece may be used. The time correction method of the present invention is not limited to timepieces and can be applied widely to electronic devices with the radio controlled timepiece function.

That is, although the radio controlled timepiece has been described in the above embodiments, the radio controlled timepiece includes all kinds of timepieces such as a wrist watch, a wall clock, and a table clock. The present invention is not limited to the radio controlled timepiece and may be a portable information terminal apparatus housing the radio controlled timepiece, such as a camera, a digital camera, a digital camcorder, a game machine, a cellular phone, a PDA (Personal Digital Assistance), and a laptop personal computer, as well as an electronic device including household electrical appliances and automobiles.

INDUSTRIAL APPLICABILITY

As described above, the present invention is useful for a radio controlled timepiece that receives standard radio waves, and particularly suitable for a global fully automatic radio controlled timepiece that can perform automatic correction to a standard time in each country or region by automatically selecting a transmitting station from which the standard radio wave can be automatically received to obtain time information even if a user of the radio controlled timepiece travels around countries or regions.

The invention claimed is:

1. A radio controlled timepiece comprising:
- a clocking unit configured to clock a time;
- a display unit configured to display a time based on clock information from the clocking unit;
- a receiving unit configured to receive standard radio waves from transmitting stations in at least two countries or regions;
- a second-synchronization detecting unit configured to detect second-synchronization information from a demodulated signal obtained by the receiving unit, wherein the second-synchronization detecting unit includes:
  - an edge detecting unit configured to sequentially or synchronously detect rising edges and falling edges of the demodulated signal; and
  - a synchronization determining unit configured to obtain the second-synchronization information of the demodulated signal based on the detected rising edges or the detected falling edges;
- a transmitting station determining unit configured to analyze the demodulated signal based on the second-synchronization information to determine a transmitting station in a country or a region; and
- a decoding unit configured to decode information included in the standard radio wave from the transmitting station determined by the transmitting station determining unit to obtain time information, wherein
- the clock information of the clocking unit is corrected based on the time information obtained by the decoding unit.

2. The radio controlled timepiece according to claim 1, wherein the receiving unit includes a reception switching unit and the reception switching unit is configured to receive a standard radio wave from another transmitting station with the reception switching unit if the second-synchronization information cannot be detected by the second-synchronization detecting unit, if the transmitting station cannot be determined by the transmitting station determining unit, or if the time information cannot be decoded by the decoding unit.

3. The radio controlled timepiece according to claim 1, wherein the transmitting station determining unit is configured to analyze the demodulated signal based on the second-synchronization information to determine the transmitting station in the country or region from a waveform of a position marker appearing in a constant cycle.

4. The radio controlled timepiece according to claim 1, wherein the transmitting station determining unit is configured to analyze the demodulated signal based on the second-synchronization information to determine the transmitting station in the country or region based on a particular waveform of the demodulated signal.

5. The radio controlled timepiece according to claim 1, wherein the second-synchronization detecting unit is configured to prioritize an order in determination of the transmitting station by the transmitting station determining unit based on the detected second-synchronization information.

6. The radio controlled timepiece according to claim 1, wherein the receiving unit is configured to receive a standard radio wave of a transmitting station from which a standard radio wave is successfully received in last reception, first.

7. The radio controlled timepiece according to claim 1, wherein the receiving unit includes a storing unit configured to store information on a transmitting station for which reception has succeeded before, and is configured to determine an order of switching based on the information on the transmitting station stored in the storing unit.

8. An electronic device comprising the radio controlled timepiece according to claim 1.

9. A radio controlled timepiece comprising:
- a clocking unit configured to clock a time;
- a display unit configured to display a time based on clock information from the clocking unit;
- a receiving unit configured to receive standard radio waves from transmitting stations in at least two countries or regions;
- a second-synchronization detecting unit configured to detect second-synchronization information from a demodulated signal obtained by the receiving unit, wherein the second-synchronization detecting unit includes;
- a sampling unit configured to sequentially or synchronously detect logic “1” or logic “0” of the demodulated signal at regular intervals; and
- an adding unit configured to add up a number of times of detection of any one of the logic “1” and the logic “0” detected by the sampling unit,
- a transmitting station determining unit configured to analyze the demodulated signal based on the second-synchronization information to determine a transmitting station in a country or a region; and a decoding unit configured to decode information included in the standard radio wave from the transmitting station determined by the transmitting station determining unit to obtain time information, wherein the clock information of the clocking unit is corrected based on the time information obtained by the decoding unit, and the transmitting station determining unit is configured to determine the transmitting station in the country or region based on a result of addition by the adding unit in the second-synchronization detecting unit.

10. A radio controlled timepiece, comprising:

a clocking unit configured to clock a time;

a display unit configured to display a time based on clock information from the clocking unit;

a receiving unit configured to receive standard radio waves from transmitting stations in at least two countries or regions;

a second-synchronization detecting unit configured to detect second-synchronization information from a demodulated signal obtained by the receiving unit, wherein the second- synchronization detecting unit includes:

a sampling unit configured to sequentially or synchronously detect rising edges and falling edges of the demodulated signal; and an adding unit configured to add up a number of times of detection of the rising edges and falling edges of the demodulated signal;

a transmitting station determining unit configured to analyze the demodulated signal based on the second-synchronization information to determine a transmitting station in a country or a region; and a decoding unit configured to decode information included in a standard radio wave from the transmitting station determined by the transmitting station determining unit to obtain time information, wherein the clock information of the clocking unit is corrected based on the time information obtained by the decoding unit.

11. The radio controlled timepiece according to claim 10, wherein the sampling unit is configured to sequentially and synchronously detect the rising edges and falling edges of the demodulated signal at regular intervals, and the adding unit is configured to add up the number of times of detection of the rising edges and the falling edges detected by the sampling unit for each sampling position, and the second-synchronization detecting unit further includes:

a storing unit configured to store the number of times of the detection of the rising edges and the falling edges added up for each sampling position by the adding unit; and a waveform determining unit configured to obtain the second-synchronization information of the demodulated signal based on the number of times of the detection of the rising edges and the falling edges for each sampling position stored in the storing unit.

* * * * *